(12) United States Patent
Camenisch et al.

(10) Patent No.: US 9,111,115 B2
(45) Date of Patent: *Aug. 18, 2015

(54) OBLIVIOUS TRANSFER WITH HIDDEN ACCESS CONTROL LISTS

(71) Applicant: INTERNATIONAL BUSINESS MACHINES CORPORATION, Armonk, NY (US)

(72) Inventors: Jan Leonhard Camenisch, Thalwil (CH); Maria Dubovitskaya, Zurich (CH); Gregory Neven, Oberrieden (CH); Greg Zaverucha, Waterloo (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,053

(22) Filed: Nov. 4, 2013

(65) Prior Publication Data

US 2014/0059345 A1 Feb. 27, 2014

Related U.S. Application Data

(63) Continuation of application No. 13/228,574, filed on Sep. 9, 2011, now Pat. No. 8,577,029.

(30) Foreign Application Priority Data

Sep. 10, 2010 (EP) .................................... 10176124

(51) Int. Cl.
*G06F 21/62* (2013.01)
*H04L 9/30* (2006.01)
*H04L 9/32* (2006.01)
*H04L 9/08* (2006.01)

(52) U.S. Cl.
CPC .......... *G06F 21/6227* (2013.01); *H04L 9/0861* (2013.01); *H04L 9/3073* (2013.01); *H04L 9/3218* (2013.01); *H04L 2209/50* (2013.01)

(58) Field of Classification Search
CPC combination set(s) only.
See application file for complete search history.

(56) References Cited

U.S. PATENT DOCUMENTS 5,495,533 A * 2/1996 Linehan et al. ................ 713/155
2007/0180497 A1 * 8/2007 Popescu et al. .................... 726/4

OTHER PUBLICATIONS

Damgard (Damgard et al., "Non-interactive zero-knowledge from homomorphic encryption", TCC 2006, LNCS 3876, pp. 41-59, 2006).*
Choi (Choi et al., "Two-Party Computing with Encrypted Data", ASIACRYPT 2007, LNCS 4833, pp. 298-314, 2007.*

(Continued)

*Primary Examiner* — Peter Poltorak
(74) *Attorney, Agent, or Firm* — Scully, Scott, Murphy & Presser, P.C.; Jennifer Davis, Esq.

(57) ABSTRACT

A method, apparatus, and a computer readable storage medium having computer readable instructions to carry out the steps of the method for anonymous access to a database. Each record of the database has different access control permissions (e.g. attributes, roles, or rights). The method allows users to access the database record while the database does not learn who queries a record. The database does not know which record is being queried: (i) the access control list of that record or (ii) whether a user's attempt to access a record had been successful. The user can only obtain a single record per query and only those records for which he has the correct permissions. The user does not learn any other information about the database structure and the access control lists other than whether he was granted access to the queried record, and if so, the content of the record.

20 Claims, 14 Drawing Sheets

(56) References Cited

OTHER PUBLICATIONS

Wang (Wang et al., "Deterring Voluntary Trace Disclosure in Re-encryption Mix-Networks", ACM Transactions on Information and System Security, vol. 13, No. 2, Article 18, Publication date: Feb. 2010.*

Damgard et al., "Non-interactive zero-knowledge from homomorphic encryption", TCC '06 Proceedings of the Third conference of Theory of Crytography, pp. 41-59, ISBN:3-540-32731-2 978-3-540-32731-8, 2006.

J. Camenish et al., "Oblivious Transfer With Access Control" CCS'09 Proceedings of the 16th ACM Conference on Computer and Communications Security, 2009, ACM, New York, NY, USA.

Holt et al., "Hidden Credentials" WPES '03 Proceedings of the 2003 ACM Workshop on Privacy in the Electronic Society, 2003, ACM, New York, NY, USA.

Frikken et al., "Hidden Access Control Policies With Hidden Credentials", WPES '04 Proceedings of the 2004 ACM Workshop on Privacy in Electronic Society 2004, ACM, New York, NY, USA.

Holt et al., "Concealing Complex Policies With Hidden Credentials", CCS '04 Proceedings of the 11th ACM Conference on Computer and Communications Security, 2004, ACM, New York, NY, USA.

Herranz, "Restricted adaptive oblivious transfer", Cryptology ePrint Archive, Report 2008/182, 2008.

Coull et al., "Controlling access to an oblivious database using stateful anonymous credentials", PKC 2009, LNCS, vol. 5443, 501-520, Springer, 2009.

Frikken et al., "Attribute-based access control with hidden policies and hidden credentials", IEEE Trans. Computers, 55(10): 1259-1270, 2006.

A.C. Yao, "Protocols for secure computations", in 23rd FACS, 160-164, IEEE Computer Society Press, 1982.

J. Groth, "Efficient non-interactive proof systems for bilinear groups", in EUROCRYPT 2008, LNCS, vol. 4965, 415-432, Springer, 2008.

Boneh et al., "Short group signatures", in CRYPTO 2004, LNCS, vol. 3152, 41-55, Springer, 2004.

Boneh et al., "Short signature without random oracles", Proc. of EUROCRYPT 2004, vol. 3027 of LNCS, pp. 56-73, Springer Verlag 2004.

Au, et al., "Constant-size dynamic k-TAA", Proc. of SCN 06, vol. 4116 of LNCS, pp. 111-125, Springer Verlag 2006.

Camenisch et al., "Signature schemes and anonymous credentials from bilinear maps", Proc. of CRYPTO 2004, vol. 3152 of LNCS, pp. 56-72, Springer Verlag 1999.

Camenisch et al., "Efficient group signature schemes for large groups", Proc. of '97, vol. 1296 of LNCS, pp. 410-424, LNCS, Springer Verlag, 2009.

Camenisch et al., "On the portability of generalized schnorr proofs", Proc. of EUROCRYPT 2009, LNCS, Springer Verlag, 2009.

Camenisch et al., "A public key encryption scheme secure against key dependent chosen plaintext and adaptive chosen ciphertext attacks", in EUROCRYPT 2009, LNCS, vol. 5479, 351-368, Springer, 2009.

* cited by examiner

ISetup($C$):

$(\overline{G}, \overline{G}_T, p) \xleftarrow{\$} Pg(1^\kappa); g_I, h_0, ..., h_{l+1}, u, w \xleftarrow{\$} \overline{G}^{\ell+5}$
$g_t, h_t \xleftarrow{\$} \overline{G}_T^2; x_I \xleftarrow{\$} \mathbb{Z}_p; y_I \leftarrow g_I^{x_I}$
Return $(sk_I \leftarrow x_I, pk_I \leftarrow (g_I, h_0, ..., h_{\ell+1}, u, w, g_t, h_t, y_I))$

Fig. 3

Issue():

$U(\vec{d}, pk_I)$:                                                $I(sk_I, pk_I, \vec{d})$:

$$s_c, r_c \xleftarrow{\$} \mathbb{Z}_p$$

$$A \leftarrow (g_I h_1^{c_1} \ldots h_\ell^{c_\ell} h_{\ell+1}^r)^{\frac{1}{x_I + s}}$$

$$\xleftarrow{s_c, A_c}$$

If $\bar{e}(A, g_I^s y_I) = \bar{e}(g_I h_1^{c_1} \ldots h_\ell^{c_\ell} h_{\ell+1}^r, g_I)$ then return $Cred \longleftarrow (\vec{d}, A, r, s)$

Fig. 5

DBSetup($G_1, G_2, G_T, p, e, CRS, pk_I, DB = (R_i, ACL_i)_{i=1,...,N}$)

---

1. Generate system parameters and keys $g, h \xleftarrow{\$} G_1^*; h_{DB} \xleftarrow{\$} G_2^*; H \leftarrow e(g, h_{DB})$ $x_e, x_{DB} \xleftarrow{\$} \mathbb{Z}_p; y_e \leftarrow g^{x_e}; y_{DB} \leftarrow g^{x_{DB}}$ $\pi_{setup} = (GSProve(CRS, y_e = g^{x_e}, y_e, g, x_e),$
$\qquad\qquad GSProvePPE(CRS, H, g, h_{DB}))$ For $i = 1, ..., \ell+1$ do
$\quad x_i \xleftarrow{\$} \mathbb{Z}_p; y_i \leftarrow g^{x_i}$ $sk_{DB} \leftarrow (h_{DB}, x_e, x_{DB}, x_1, ..., x_{\ell+1});$
$pk_{DB} \leftarrow (g, H, h, y_e, y_{DB}, y_1, ..., y_{\ell+1}, \pi_k)$ 2. Create an encrypted database
   For $i = 1, ..., N$ do
   Parse $ACL_i$ as $(c_{i1}, ..., c_{i\ell})$ 2.1 Sign and encrypt records:

$v_i \xleftarrow{\$} \mathbb{Z}_p; V_i \leftarrow g^i y_1^{c_{i1}} ... y_\ell^{c_{i\ell}} y_{\ell+1}^{v_i}$ $\sigma_i \leftarrow g^{\frac{1}{x_{DB} + i + \Sigma_{j=1}^{\ell} x_j \cdot c_{ij} + x_{\ell+1} v_i}}$ $F_i \leftarrow e(h_{DB}, \sigma_i) \cdot R_i$ 2.2 Encrypt categories from the record ACL:
   For each bit $c_{ij}$ generate $r_{ij} \xleftarrow{\$} \mathbb{Z}_p, j = 1...\ell$ $E_{ij}^{(1)} = g^{c_{ij}} y_e^{r_{ij}}; E_{ij}^{(2)} = g^{r_{ij}}; E_{ij} = (E_{ij}^{(1)}, E_{ij}^{(2)})$ 2.3 Generate GS proof that all keys, signatures and encryptions
   were computed correctly $\pi_i = GSProve(CRS, stmt_i$
   $\qquad ((E_{ij}), V_i), (g, y_e, (y_j)), (v_i, (c_{ij}), (r_{ij})))$ 2.4 $ER_i \leftarrow (\sigma_i, V_i, F_i, (E_{i1}, ..., E_{i\ell}), \pi_i)$ 3. Publish an encrypted database and public key
   Return $EDB \leftarrow ((pk_{DB}, ER_1, ..., ER_N), sk_{DB})$

Fig. 8

OBLIVIOUS TRANSFER WITH HIDDEN ACCESS CONTROL LISTS

CROSS-REFERENCE TO RELATED APPLICATION

This application is a continuation application of commonly-owned, co-pending U.S. patent application Ser. No. 13/228,574 filed Sep. 9, 2011 which further claims priority under 35 U.S.C. §119 from European Patent Application No. 10176124.5 filed Sep. 10, 2010, the entire contents of which are incorporated herein by reference.

BACKGROUND OF THE INVENTION

The present invention relates to a method for anonymously reading database records, wherein each record has different access control permissions.

When controlling access to a sensitive resource, it is clear that the applicable access control policies can already reveal too much information about the resource. An example is a medical database containing patient records, where the access control list (ACL) of each record lists the names of the treating doctors. The fact that a patient's record has certain specialists in its ACL leaks information about the patient's disease. Many patients want to hide the fact that they are being treated by a plastic surgeon or a psychiatrist. Also, doctors treating a celebrity want to remain anonymous to avoid being approached by the press. As another example, in a multi-user file system, it can be desirable to hide the owner of a file or the groups that have access to it to prevent social engineering attacks, coercion, and bribery. In a military setting, knowing which files are classified "top secret", or even just the percentage of "top secret" files in the system, can help an attacker to focus his attack.

But confidentiality of the stored data is not the only security concern. Privacy-aware users accessing the database can be worried about malicious database servers prying information from the query traffic. For example, the frequency that a patient's record is accessed gives a good idea of the seriousness of his condition, while the identity of the doctors that access it most frequently can be an indication of the nature of the disorder. Users can query the database anonymously, i.e., hiding their identity, roles, permissions, etc. from the database server, as well as hiding the index of the queried record. At the same time, the database server can be confident that only permitted users have access to the data, and that they cannot find out whom else has access to the data.

Oblivious transfer (OT) protocols in their basic form offer users access to a database without the server learning the contents of the query, but place no restrictions on who can access which records. In the paper by J. Herranz, "Restricted adaptive oblivious transfer", Cryptology ePrint Archive, Report 2008/182, 2008, access control restrictions were added to records the first time, but users have to authenticate openly (i.e., non-anonymously) to the server. Later, Coull et al. ("Controlling access to an oblivious database using stateful anonymous credentials", in PKC 2009, LNCS, vol. 5443, 501-520, Springer, 2009) and Camenisch et al. ("Oblivious transfer with access control", in ACM CCS 09, 131-140, ACM Press, 2009) proposed OT protocols with anonymous access control. In all of these works, however, the access control policies are assumed to be publicly available to all users, and the server notices when a user attempts to access a record for which she does not have the right credentials.

There is a line of work devoted to access control with hidden policies and hidden credentials, but none of them consider oblivious access to data, i.e., the server learns which resource is being accessed. In trust negotiation systems two parties establish trust through iterative disclosure of and requests for credentials. Hidden credentials systems are designed to protect sensitive credentials and policies. However, full protection of policies is not provided in the sense that the user learns (partial) information about the policy if her credentials satisfy it. The protocol of Frikken et al. ("Attribute-based access control with hidden policies and hidden credentials", IEEE Trans. Computers, 55(10):1259-1270, 2006) does provide full protection, but for arbitrary policies it requires communication exponential in the size of the policies.

One can always implement a protocol with all desired properties by evaluating an especially designed logical circuit using generic two-party computation techniques (A.C. Yao, "Protocols for secure computations", in $23^{rd}$ FOCS, 160-164, IEEE Computer Society Press, 1982), but the cost of this approach can be prohibitive. In particular, the computation and communication cost of each record transfer can be linear in the number of records in the database N, whereas the efficiency of our transfer protocol is independent of N.

It is therefore desirable to combine the advantages of an oblivious access control protocol with hidden ACLs. But for example the protocol of Camenisch et al. relies heavily on zero-knowledge proofs of knowledge that a user's credentials satisfy the applicable ACL. Such approaches no longer work for hidden ACLs because the user does not know the statement that has to be proven. In fact, the user does not even know whether the statement is true at all.

SUMMARY OF THE INVENTION

According to one embodiment of the present invention, a computer system is described. A computer system includes a database server including a publisher configured to publish an encrypted form of a database, the database including at least one record with an associated index and a list of access-control attributes for each record, at least one user of the database, and an Issuer configured to provide a credential for each access-control attribute of the database, which is assigned to the at least one user. The system also includes a database encryptor, which includes a key generator configured to generate an encryption key for a record such that the encryption key is derived from at least the index of the record and the access-control attributes and a secret key of the database server, a record encryptor responsive to the key generator configured to encrypt a database record with the encryption key, and an access-control encryptor configured to encrypt the access-control attributes, which includes a generator configured to generate a non-interactive zero-knowledge proof that the access-control attributes were correctly encrypted where the publisher is being responsive to the database encryptor.

According to another aspect of the present invention, a method for anonymously reading records from a database provided. A method for anonymously reading records from a database is provided by a database server, where the database includes at least one record with an associated index and a list of access-control attributes for each record, and where the database server publishes an encrypted form of the database, and where at least one user of the database obtains credentials from an Issuer for each access-control attribute which is assigned to the at least one user, and where for each record in the encrypted form of the database. The steps include generating a key that is derived from at least the index of the record and the access-control attributes and a secret key of the database server, encrypting the record with the key, encrypting the associated lists of access-control attributes for each record in the encrypted form of the database, and generating a non-interactive zero-knowledge proof that the access-control attributes were correctly encrypted.

According to yet another embodiment of the present invention, a computer readable storage medium embodying computer readable instructions is provided. A computer readable storage medium embodying a computer readable program code having computer readable instructions which, when implemented, cause a computer to carry out the steps of a method for anonymously reading records from a database provided by a database server, where the database includes at least one record with an associated index and a list of access-control attributes for each record, and where the database server publishes an encrypted form of the database, and where at least one user of the database obtains credentials from an Issuer for each access-control attribute which is assigned to the at least one user, and where for each record in the encrypted form of the database. The steps include generating a key that is derived from at least the index of the record and the access-control attributes and a secret key of the database server, encrypting the record with the key, encrypting the associated lists of access-control attributes for each record in the encrypted form of the database, and generating a non-interactive zero-knowledge proof that the access-control attributes were correctly encrypted.

BRIEF DESCRIPTION OF THE DRAWINGS

FIG. 3: Is a description of an issuer setup algorithm in accordance with the present invention;

FIG. 5: Is a description of an issue protocol between a user and an issuer in accordance with the present invention;

FIG. 8: Is a description of a database setup protocol in accordance with the present invention;

DETAILED DESCRIPTION OF THE PREFERRED EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The advantages of the present invention are achieved by a novel extension of troth-Sahai (GS) non-interactive proofs of knowledge (J. Groth "Efficient non-interactive proof systems for bilinear groups", in EUROCRYPT 2008, LNCS, vol. 4965, 415-432, Springer, 2008). Namely, in the inventive protocol, during setup the database encrypts the ACL of each record and attaches a GS-proof that the ciphertext contains the correct ACL. When querying a record, the user re-encrypts the ACL under her own public key, and transforms the given GS-proof into a new GS-proof that the ciphertext still contains the correct ACL—even though the user herself does not know this ACL. Then, using the homomorphic properties of the encryption, the ACL is compared to the credential held by the user. If access is allowed the user recovers the record, and if not the protocol completes but the user's output is a random value.

DEFINITIONS

Figure 1:
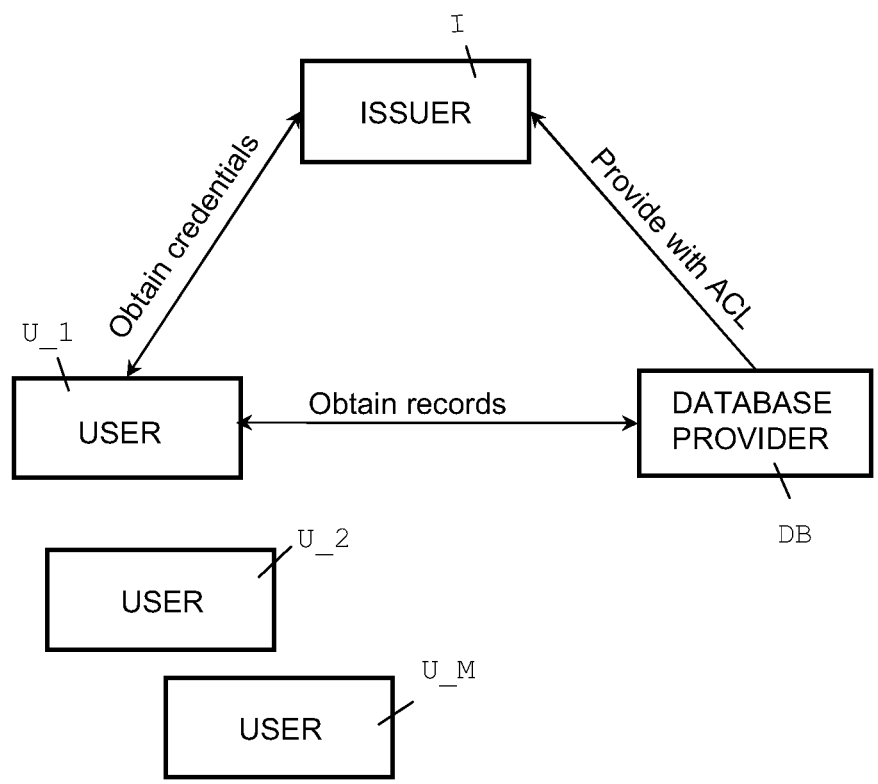
FIG. 1: Is a block diagram illustrating a system in accordance with the present invention.

As shown in FIG. 1, an oblivious transfer protocol with hidden access control lists (HAC-OT) is run between an issuer I, a database server DB, and one or more users $U\_1$, $U\_2, \ldots, U\_M$. The issuer I provides access credentials to the users $U\_1, U\_2, \ldots, U\_M$ for the data categories that they are entitled to access. The database provider DB hosts lists of records and associates to each record an ACL. The users $U\_1, U\_2, \ldots, U\_M$ can request individual records from the database provider DB, and the request will succeed provided they have the necessary credentials. The ACLs are never revealed.

Figure 2:
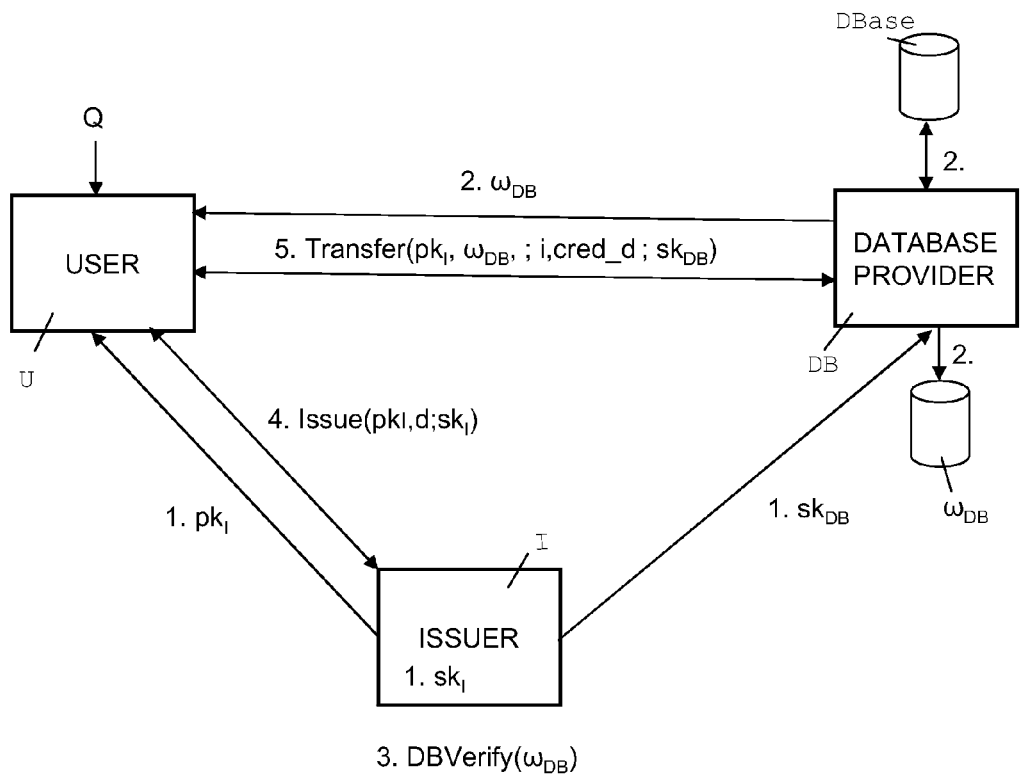
FIG. 2: Is combined block and flow diagram illustrating a system and method in accordance with the present invention.

In a nutshell as shown in FIG. 2, a HAC-OT protocol works as follows. Step 1: The issuer I generates its key pair $sk_I$, $pk_I$ for issuing credentials and publishes the public key $pk_I$ as a system-wide parameter. Step 2: The database provider DB initializes a database DBase containing records protected by ACLs. It generates the encrypted database $\omega_{DB}$ with its secret key $sk_{DB}$, which also contains the encrypted ACLs, and makes it available to all users, e.g., by posting it on a website or by distributing it on DVDs. Step 3: Each user U verifies the encrypted database $\omega_{DB}$. Step 4: Each user U contacts the issuer I to obtain a credential $cred_d$ that lists all data categories d that the user U is entitled to access. Step 5: When she wants to access a record with index i in the database DBase, the user U proves to the database provider DB (in zero-knowledge), that her credential $cred_d$ contains all the data categories d required by the ACL associated to the record. She performs computations on the encrypted ACL associated to the desired record so that, with the help of the database provider DB, she will obtain the record key if and only if she satisfies the (encrypted) rule. The database provider learns nothing about the index of the record that is being accessed, nor about the categories in the ACL. The database provider DB does not even learn whether the user's U attempt to obtain a record was successful.

Scheme Syntax

If $\kappa \in \mathbb{N}$, then $1^\kappa$ is the string consisting of $\kappa$ ones. The empty string is denoted $\in$. If A is a randomized algorithm, then $$y \xleftarrow{\$} A(x)$$

denotes me assignment to y of the output of A on input x when run with fresh random coins. Unless noted, all algorithms are probabilistic polynomial-time (PPT) and it is implicitly assumed that they take an extra parameter $1^\kappa$ in their input, where $\kappa$ is a security parameter. A function v: $\mathbb{N} \to [0,1]$ is negligible if for all $c \in \mathbb{N}$ there exists a $\kappa_c \in \mathbb{N}$ such that $v(\kappa) < \kappa^{-c}$ for all $\kappa > \kappa_c$.

A setting with a limited universe of data categories $C = \{C_1, \ldots, C_l\} \in \{0,1\}^*$ is considered only. An access control list $ACL \subseteq C$ contains those data categories that a user needs to have access to in order to obtain the record. The ACLs are encoded as vectors $\vec{c} = (c_1, \ldots, c_l) \in \{0,1\}^l$, where $c_i = 1$ if and only if $C_i \in ACL$. A database consists of a list of N pairs $((R_1, ACL_1), \ldots, (R_N, ACL_N))$ of records $R_i \in \{0,1\}^*$ and their associated ACLs $ACL_i \subseteq C$.

Users hold credentials that certify the list of categories that the user is entitled to access. The list is encoded as a vector $\vec{d} = (d_1, \ldots, d_l) \in \{0,1\}^l$, with the same interpretation as the ACL of a record. Letting $\vec{c} \cdot \vec{d} = \sum_{i=1}^{l} c_i \cdot d_i$ and $|\vec{c}| = \sum_{i=1}^{l} c_i$, a user's credential covers an ACL $\vec{c}$ if $\vec{c} \cdot \vec{d} = |\vec{c}|$.

This essentially means that users need to have access to all categories in the ACL in order to have access to the record. This fits nicely to a number of real-world access control models. For example, to implement role-based access control, where each database record can be accessed by users with one particular role, one sets t to be the number of roles in the system, one sets $c_i = 1$ for the required role i and $c_j = 0$ for all $j \ne i$, and one sets $d_i = 1$ in the users' credentials for all roles i that a user owns. In a hierarchical access control system, users are granted access if their access level is at least that of the resource. For example, in a military context, the levels can be "top secret", "secret", "restricted", and "declassified", so that someone with "top secret" clearance has access to all records. This can be implemented by setting l to be the number of levels, setting $c_i = 1$ for the level i of the resource, and set $d_j = 1$ for all levels j lower than or equal to i.

Alternatively, one can use a coverage definition where $\vec{d}$ covers $\vec{c}$ if $\vec{c} \cdot \vec{d} = |\vec{d}|$, effectively meaning that all of a user's categories have to appear in the ACL in order to be granted access. The protocol is easily adapted to implement these semantics. This definition of coverage can be useful to implement simple access control matrices: if l is the number of users, then user i can have a credential with $d_i = 1$, and the ACL sets $c_j = 1$ for all users j that are allowed access.

An oblivious transfer protocol with hidden access control lists (HAC-OT) is included of five polynomial-time algorithms and protocols ISetup, Issue, DBSetup, DBVerify, Transfer.

The issuer runs the randomized ISetup algorithm $$ISetup(C) \xrightarrow{\$} (pk_I, sk_I)$$

to generate a public key $pk_I$ and corresponding secret key $sk_I$ for security parameter $\kappa$ and category universe C. He publishes the public key as a system-wide parameter.

A user obtains an access credential for the vector of categories $\vec{d} = (d_1, \ldots, d_l) \in \{0,1\}^l$ by engaging in the Issue protocol with the issuer. The issuer's public key $pk_I$ and $\vec{d}$ are common inputs, and the issuer also uses his secret key $sk_I$ as an input. At the end of the protocol, the user obtains the access credential $cred_d$.

To create a database containing records $R_1, \ldots, R_N$ protected by access control lists $ACL_1, \ldots, ACL_N$, the database provider runs the DBSetup algorithm $$DBSetup(pk_I, DB = (R_i, ACL_i)_{i=1,\ldots,N}) \xrightarrow{\$} ((pk_{DB}, ER_1, \ldots, ER_N), sk_{DB}).$$

This generates the encrypted database consisting of a public key $pk_{DB}$ and encrypted records along with encrypted access control lists $ER_1, \ldots, ER_N$. The encrypted database is made available to all users, e.g. by posting it on a website. It is assumed that each user obtains a copy of the entire encrypted database. The database provider keeps the secret key to the database for itself.

Upon receiving an encrypted database EDB, all users perform a one-time check $$DBVerify(pk_I, EDB) \xrightarrow{\$} b$$

to test whether EDB is correctly formed (b=1) or not (b=0).

When the user wants to access a record in the database, she engages in a Transfer protocol with the database provider. Common inputs are the issuer's public key $pk_I$ and that of the database $pk_{DB}$. The user has a secret input her selection index $i \in \{1, \ldots, N\}$, the encrypted record with encrypted ACL, and her credential $cred_U$. The database provider uses its secret key $sk_{DB}$ as a private input. At the end of the protocol, the users obtains the database record $R_i$ in a readable form if her credential satisfies the ACL, and in unreadable form if the user is not allowed to access that record, or $\perp$ indicating failure.

It is assumed that all communication links are private. It is also assumed that the communication links between a user and the issuer are authenticated, so that the issuer always knows to which user it is issuing a credential. The communication links between a user and the database are assumed to be anonymous, so that the database does not know which user is making a record query. (Authenticated communication channels between users and the database can obviously ruin the strong anonymity properties of the protocol.

Preliminaries

Let $Pg(1^\kappa)$ be a pairing group generator that on input $1^\kappa$ outputs descriptions of multiplicative groups $\Gamma_1, \Gamma_2, \Gamma_T$ of prime order p where $|p| > \kappa$. Let $Pg(p)$ be a pairing group generator that on input p outputs descriptions of multiplicative groups $\Gamma_1, \Gamma_T$ of prime order p. Let $\Gamma_1^* = \Gamma_1 \setminus \{1\}$ and let $g \in \Gamma_1^*$. The generated groups are such that there exists an admissible bilinear map e: $\Gamma_1 \times \Gamma_2 \to \Gamma_T$, meaning that (1) for all $a, b \in Z_p$ it holds that $e(g^a, g^b) = e(g, g)^{ab}$; (2) $e(g, g) \ne 1$; and (3) the bilinear map is efficiently computable.

We denote as a group setting GroupSet a tuple $(\Gamma_1, \Gamma_2, \Gamma_T, p, e)$ and assume that 2-linear assumption holds in $\Gamma_2$ (D. Boneh et al. "Short group signatures", in CRYPTO 2004, LNCS, vol. 3152, 41-55, Springer, 2004).

The following modification of the weakly-secure signature scheme from D. Boneh and X. Boyen "Short signatures without random oracles", Proc. of EUROCRYPT 2004, vol. 3027 of LNCS, pp. 56-73, Spinger Verlag 2004, is used. The scheme uses a pairing generator Pg as defined above. The signer's secret key is $$(x_m, x_1, \ldots, x_l) \xleftarrow{\$} \mathbb{Z}_p,$$

the corresponding public key is $(g, y_m = g^{x_m}, y_1 = g^{x_1}, \ldots, y_l = g^{x_l})$ where $g$ is a random generator of $\Gamma_1$. The signature on the tuple of messages $(m, c_1, \ldots, c_l)$ is $$s \leftarrow g^{\frac{1}{x_m + m + x_1 c_1 + \ldots + x_l c_l}};$$

verification is done by checking whether $e(s, y_m^m \cdot y_1^{c_1} \cdot \ldots \cdot y_l^{c_l}) = e(g, g)$ is true.

Security against weak chosen message attacks is defined through the following game. An adversary begins by outputting N tuples of messages $((m_1, c_{1,1}, \ldots, c_{1,l}), \ldots, (m_N, c_{N,1}, \ldots, c_{N,l}))$. A challenger then generates the key pair and gives the public key to the adversary, together with signatures $s_1, \ldots, s_N$ on the message tuples. The adversary wins if it succeeds in outputting a valid signature $s$ on a tuple $(m, c_1, \ldots, c_l) \notin \{(m_1, c_{1,1}, \ldots, c_{1,l}), \ldots (m_N, c_{N,1}, \ldots, c_{N,l})\}$.

This scheme is said to be unforgeable under weak chosen-message attack if no PPT adversary has non-negligible probability of winning this game. An adaptation of the proof by Boneh and Boyen can be used to show that this scheme is unforgeable under weak chosen message attack if the (N+1)-SDH assumption holds.

The signature scheme proposed and proved secure by Au et al. [M. H. Au, W. Susilo, and Y. Mu "Constant-size dynamic k-TAA", Proc. of SCN 06, vol. 4116 of LNCS, pp. 111-125, Springer Verlag 2006] is used, which is based on the schemes of Camenisch and Lysyankaya [J. Camenisch, A. Lysyanskaya "Signature schemes and anonymous credentials from bilinear maps", Proc. of CRYPTO 2004, vol. 3152 of LNCS, pp. 56-72, Springer Verlag 1999] and of Boneh et al. [D. Boneh, X. Boyen, h. Shacham "Short group signatures", Proc. of CRYPTO 2004, vol. 3152 of LNCS, Springer Verlag 2004]. It assumes cyclic groups $\Gamma$ and $\Gamma_T$ of order $p$ and a bilinear map $e: \Gamma \times \Gamma \rightarrow \Gamma_T$. The signer's secret key is a random element $$x \xleftarrow{\$} \mathbb{Z}_q.$$

The public key contains a number of random bases $$g_1, h_0, \ldots, h_l, h_{l+1} \xleftarrow{\$} \Gamma$$

where $l \in \mathbb{N}$ is a parameter, and $y \leftarrow g_1^x$.

A signature on messages $m_0, \ldots, m_l \in \mathbb{Z}_q$ is a tuple $(A, r, s)$ where $r$, $$s \xleftarrow{\$} \mathbb{Z}_q$$

are values chosen at random by the signer and $$A = (g_1 h_0^{m_0} \ldots h_l^{m_l} h_{l+1}^r)^{\frac{1}{x+s}}.$$

Such a signature can be verified by checking whether $e(A, g_1^s y) = e(g_1 h_0^{m_0} \ldots h_l^{m_l} h_{l+1}^r, g_1)$.

Now it is assumed that a signature $(A, r, s)$ is given on messages $m_0, \ldots, m_l \in \mathbb{Z}_q$ and that it will be proved if indeed such a signature is possessed. The public key needs to be augmented with values $u, v \in \Gamma$ such that $\log_{g_1} u$ and $\log_{g_1} v$ are not known. This can be done as follows:

Choose random values $t$, $$t' \xleftarrow{\$} \mathbb{Z}_q$$

and compute $\tilde{A} = A u^t$, $B = v^t u^{t'}$;

Execute the following proof of knowledge $$PK\left\{(\alpha, \beta, s, t, t', m_0, \ldots, m_l, r): B = v^t u^{t'} \wedge 1 = B^{-s} v^\alpha u^\beta \wedge \frac{e(\tilde{A}, y)}{e(g_1, g_1)} = e(\tilde{A}, g_1)^{-s} \cdot e(u, y)^t \cdot e(u, g_1)^\alpha \cdot e(h_{l+1}, g_1)^r \prod_{i=0}^{l} e(h_i, g_1)^{m_i}\right\}.$$

When referring to the proofs above, the notation introduced by Camenisch and Stadler ["Efficient group signature schemes for large groups", Proc. of '97, vol. 1296 of LNCS, pp. 410-424, Springer Verlag 1997] will be followed for various proofs of the validity of statements about discrete logarithms. For instance, $PK\{(a,b,c): y = g^a h^b \wedge \tilde{y} = \tilde{g}^a \tilde{h}^c\}$ denotes a "zero-knowledge Proof of Knowledge of integers $a,b,c$ such that $y = g^a h^b$ and $\tilde{y} = \tilde{g}^a \tilde{h}^c$ holds," where $y$, $g$, $h$, $\tilde{y}$, $\tilde{g}$, $\tilde{h}$ are elements of some groups $G = \langle g \langle = \rangle h \rangle$ and $\langle \tilde{g} \rangle = \langle \tilde{h} \rangle$. The convention is that the letters in the parenthesis denote quantities of which knowledge is being proven, while all other values are known to the verifier.

Given a protocol in this notation, it is straightforward to derive an actual protocol implementing the proof [see the PhD Thesis of Camenisch cited above and J. Camenisch, A. Kiayias, M. Yung "On the portability of generalized schnorr proofs", Proc. of EUROCRYPT 2009, LNCS, Springer Verlag 2009]. Indeed, the computational complexities of the proof protocol can be easily derived from this notation: basically for each term $y = g^a h^b$, the prover and the verifier have to perform an equivalent computation, and to transmit one group element and one response value for each exponent.

Groth-Sahai Proofs of Knowledge

In Groth and Sahai, "Efficient non-interactive proof systems for bilinear groups", in EUROCRYPT 2008, LNCS, vol. 4965, 415-432, Springer, 2008, efficient non-interactive witness indistinguishable (NIWI) proofs of knowledge for three types of equations involving bilinear groups are presented. These are: (i) pairing product equations, (ii) multi-exponentiation equations, and (iii) quadratic equations modulo the group order. The inventive protocol primarily uses proofs of the second type of equation, which are zero knowledge (ZK), but makes also minimal use of proofs of the first type, which are only NIWI. Belenkiy et al. have shown that the Groth-Sahai proofs can be randomized such that they still prove the same statement but different proofs for the same statement are indistinguishable. The inventive protocol takes a proof for one statement and transform and randomize it into a proof of a related statement.

The descriptions of the basic algorithms of an instantiation of the Groth-Sahai proof system for multi-exponentiation equations for the prime order groups in the group setting $$NIZKPK_{GS}\left\{((x_{ij})_{j=1,\ldots,l; i=1,\ldots,M}): \bigwedge_{i=1}^{M} y_i = \prod_{j=1}^{l} g_j^{x_{ij}}\right\}$$

GroupSet=$(\Gamma_1, \Gamma_2, \Gamma_T, p, e)$ are given in the following, i.e., the proof system where the $y_i$'s and $g_j$'s are public group elements (cf. Camenisch et al. "A public key encryption scheme secure against key dependent chosen plaintext and adaptive chosen ciphertext attacks", in EUROCRYPT 2009, LNCS, vol. 5479, 351-368, Springer, 2009). In the following let $$stmt = ((x_{ij})_{j=1,\ldots,l; i=1,\ldots,M}): \bigwedge_{i=1}^{M} y_i = \prod_{j=1}^{l} g_j^{x_{ij}}$$

The proof system for GroupSet consists of three algorithms GSSetup, GS Prove, and GSVerify. A trusted third party generates the common (public) reference string by running CRS←GSSetup(GroupSet). A proofer generates a proof as $\pi$←GSProve(CRS, stmt, $(y_i)$, $(g_j)$, $(x_{ij})$) and a verifier checks it via b←GSVerify(CRS, $\pi$, stmt, $(y_i)$, $(g_j)$), where b=1 if is true w.r.t. stmt and b=0 otherwise. In order to save space, the lists $(y_1, \ldots, y_M)$, $(g_1, \ldots, g_l)$, $(x_{1,l}, \ldots, x_{Ml})$ will be denoted as $(y_i)$, $(g_j)$, $(x_{Ml})$ whenever the indices are clear from the context.

---

GSSetup$(\Gamma_1, \Gamma_2, \Gamma_T, p, e) \xrightarrow{\$}$ CRS :

1. Return CRS = $(\chi_1, \chi_2, \gamma_1, \gamma_2) \xleftarrow{\$} \Gamma_1^4$.

GS Prove(CRS, stmt, $(y_i)$, $(g_j)$, $(x_{ij})$) $\xrightarrow{\$} \pi$ :

1. Pick $r_{ij} \xleftarrow{\$} \mathbb{Z}_q$ for $i = 1, \ldots, M$ and $j = 1, \ldots, l$.

2. For $x_{ij}$ each in $(x_{ij})$ compute the set of commitments
$$C_{ij}^{(1)} \leftarrow \gamma_1^{x_{ij}} \chi_1^{r_{ij}};$$
$$C_{ij}^{(2)} \leftarrow \gamma_2^{x_{ij}} \chi_1^{r_{ij}}.$$

3. For each $y_i$ in $(y_i)$ compute $p_i$:

$$p_i = \prod_{j=1}^{l} g_j^{r_{ij}}$$

4. Return
$\pi \leftarrow (p_i, (C_{ij}^{(1)}, C_{ij}^{(2)})_{j=1,\ldots,l})_{i=1,\ldots,M}.$ GSVerify(CRS, $\pi$, stmt, $(y_i)$, $(g_j)$) $\xrightarrow{\$}$ b :

1. If for all $i = 1, \ldots, M$ we have $$\prod_{j=1}^{l} e(C_{ij}^{(1)}, g_j) = e(y_i, \gamma_1) e(p_i, \chi_1),$$

$$\prod_{j=1}^{l} e(C_{ij}^{(2)}, g_j) = e(y_i, \gamma_2) e(p_i, \chi_2)$$

then return b ← 1, else return b ← 0.

---

This basic system is extended with a fourth algorithm GSRand which allows anyone to take a proof $\pi$ and randomize it to obtain a proof $\pi'$ for the same statement without knowledge of the witnesses $(x_{ij})$. Still, the proofs $\pi$ and $\pi'$ have the same distribution.

---

GSRand(CRS, $\pi$, stmt, $(y_i)$, $(g_j)$) $\xrightarrow{\$} \pi'$ :

1. If 0 = GSVerify(CRS, $\pi$, stmt, $(y_i)$, $(g_j)$) abort.

2. Pick $(r'_{ij}) \xleftarrow{\$} \mathbb{Z}_q$ and $i = 1, \ldots, M$ and $j = 1, \ldots, l$.

3. Re-randomize all commitments: For every compute:
$C_{ij}'^{(1)} = C_{ij}^{(1)} \chi_1^{r'_{ij}};$
$C_{ij}'^{(2)} = C_{ij}^{(2)} \chi_2^{r'_{ij}}.$ 4. Re-randomize $p_i$ (consistent with the new randomness) by computing
$p_i' = p_i \prod_{j=1}^{l} g_j^{r'_{ij}}$ 5. Return $\pi' \leftarrow (p_i', (C_{ij}'^{(1)}, C_{ij}'^{(2)})_{j=1,\ldots,l})_{i=1,\ldots,M}.$

---

It is not hard to see that the proof $\pi'$ has the same distribution as $\pi$ and will be accepted by GSVerify.

A fifth new algorithm GSRMod, which allows not only to re-randomize the proof $\pi$ for the statement $$stmt' = ((\hat{x}_{ij})_{j=1,\ldots,l; i=1,\ldots,M}): \bigwedge_{i=1}^{M} \hat{y}_i = \prod_{j=1}^{l} g_j^{\hat{x}_{ij}}$$

stmt but also to extend it to a proof $\hat{\pi}$ for the related statement where $$\hat{y}_i = \prod_{j=1}^{M} y_j^{x'_j} \prod_{j=1}^{l} g_j^{x'_{ij}}$$

Similarly to just randomizing a proof, this proof modification can be done without the knowledge of $\hat{x}_{ij}$ but it is sufficient to know $x'_j$, $x'_{ij}$. It should be noted that $\hat{x}_{ij} = x'_{ij} + \Sigma_{k=1}^{M} x_{ij} \cdot x'_k$ will hold w.r.t. the original witnesses $x_{ij}$.

---

GSRMod(CRS, $\pi$, stmt, $(\hat{y}_i)$, $(g_j)$, $(x'_k)(x'_{ij})$) $\xrightarrow{\$} \pi'$ :

1. If 0 = GSVerify(CRS, $\pi$, stmt, $(y_i)$, $(g_j)$) abort.

2. Pick $(r'_{ij}) \xleftarrow{\$} \mathbb{Z}_q$ for $i = 1, \ldots, M$ and $j = 1, \ldots, l$.

3. Create commitments for each using old commitments:

$$\hat{C}_{ij}^{(1)} = \prod_{k=1}^{M} (C_k^{(1)})^{x'_k} \gamma_1^{x'_{ij}} \chi_1^{r'_{ij}};$$

$$\hat{C}_{ij}^{(2)} = \prod_{k=1}^{M} (C_k^{(2)})^{x'_k} \gamma_2^{x'_{ij}} \chi_2^{r'_{ij}}.$$

4. Re-randomize and modify $p_i$ (consistent with the new witnesses and randomness), by computing $$\hat{p}_i = \prod_{j=1}^{M} (p_k)^{x'_k} \prod_{j=1}^{l} g_j^{r'_j}.$$

5. Return
$\hat{\pi} \leftarrow (\hat{p}_i, (\hat{C}_{ij}^{(1)}, \hat{C}_{ij}^{(2)})_{j=1,\ldots,l})_{i=1,\ldots,M}.$

---

The need for non-interactive proofs involving product equations is limited to the special case of proving knowledge of $x \in \Gamma_2$ such that $t = e(g, x)$ for public values $t \in \Gamma_T$ and $g \in \Gamma_1$.

Further, the randomization or modification functions for proofs of this type of equation are not needed. The proofs provide strong witness indistinguishable characteristics and a simulator with appropriate trapdoor information can extract the witness (extractability). For brevity it is assumed that the CRS and parameters for pairing product equations are included in those for multi-exponentiation equations, and define the following two functions. GS ProvePPE(CRS,t,g,x) outputs a proof $\pi$ that t=e(g,x), and GSVerifyPPE(CRS,t,g,$\pi$) outputs 1 if $\pi$ is valid and 0 otherwise.

A variant of ElGamal cryptosystem is employed in the construction. ElGamal encryption takes place over the group $\Gamma_p$ over which it is hard to compute discrete logarithms. Let g denote as a published generator of $\Gamma_p$. Let y=$g^x$ be the public key for the secret key x. The encryption of a message m∈{0, 1} is E(m)=($E^{(1)}$(m), $E^{(2)}$(m))=($g^m y^r$, $g^r$) for $$r \xleftarrow{\$} [1, p].$$

The encryption of a ciphertext is done as follows: m←$E^{(1)}$(m)/($E^{(2)}$(m))$^x$. The ElGamal cryptosystem is semantically secure under the Decision Diffie-Hellman (DDH) assumption over $\Gamma_p$. Here the additive homomorphism of this variant of an ElGamal cryptosystem is used:

$$E(m_1) \cdot E(m_2) = E(m_1 + m_2).$$

The Construction

The main ideas underlying the inventive protocol are as follows. First, the database provider encrypts each record with a key that depends on the index of the record and on the access control rule for the record. Furthermore, the provider encrypts the access control list for each record, using ElGamal encryptions, computes a signature on the list, and a commitment to the list. It then provides a non-interactive GS proof that the commitments and the encryptions are consistent. All of these values are then published as the encrypted database. When the user wants to access a record i, she modifies the encryptions for that record by adding a second layer of encryption, with her own freshly generated key pair. She also randomizes the commitment to the ACL and then randomizes and modifies the original GS proof by the database provider into a new one proving that the new encryptions and the new commitment are consistent. The user also blinds the database provider's signature on the categories. Using the homomorphic properties of the encryption, the user computes an encryption of $\delta = \Sigma c_{ij} d_j - \Sigma c_{ij}$.

Finally, the user sends these values to the database provider and proves in zero-knowledge that 1) she computed the encryption of $\delta$ correctly from the modified encryptions and w.r.t. the $d_j$ that appear in a credential she owns, that 2) the blinded signature is a valid signature by the database on the ACL values in the randomized commitment (without knowing these values of course). Note that $\delta$ will be 0 if the user is allowed access and non-zero otherwise. If all of these proofs verify, the database provider uses the blinded signature to compute the blinded key of the record, folds it into the encryption of $\delta$ so that decryption will produce the blinded key if $\delta$ is 0 and a random plaintext otherwise. The server sends these values to the user and proves they were computed correctly. Upon receipt, the user decrypts to produce a key with which will decrypt the record if $\delta$ was 0. Each step of the scheme will now be described in detail.

First, the setup procedures of the issuer and the database provider are described. Users do not have their own setup procedure. To set up its keys, the issuer runs the randomized ISetup algorithm displayed in FIG. 3. This will generate groups of prime order p, a public key $pk_I$ and corresponding secret key $sk_I$ for security parameter $\kappa$ and category universe C. He publishes the public key as a system-wide parameter.

Figure 4:
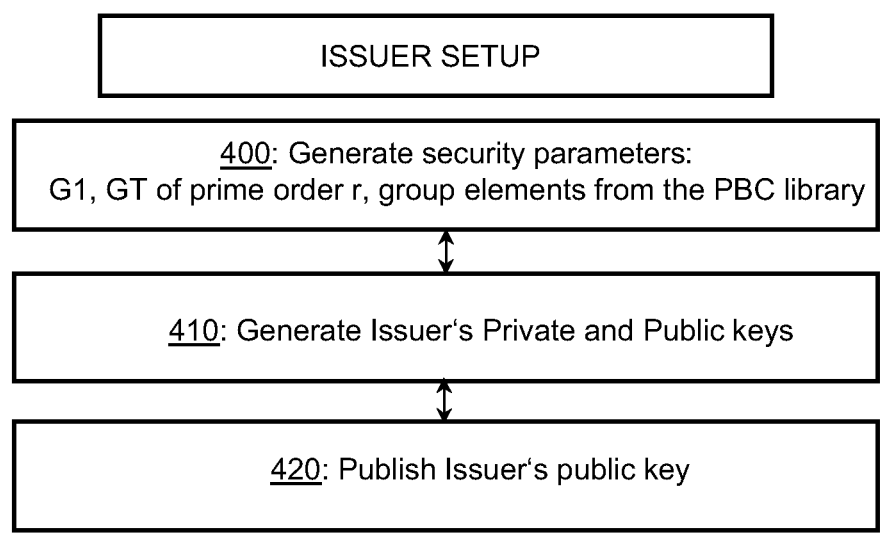
FIG. 4: Is a flow diagram of an implementation of the issuer setup algorithm of FIG. 3.

The ISetup algorithm can be implemented using the PBC library, which is a free portable C library allowing the rapid prototyping of pairing-based cryptosystems. It provides an abstract interface to a cyclic group with a bilinear pairing, insulating the programmer from mathematical details. FIG. 4 illustrates the implementation. In step 400, the security parameters are generated, especially the groups of prime order. Then, in step 410, the private and public keys of the issuer are generated, and in step 420 the encrypted records and the public key are published. The following code fragment provides an example implementation for step 410 using the PBC library:

```
//generate system parameters
element_init_G1(gl, pairing); element_random(gl);
for j = 0 to l+1 {
    element_init_G1(h[j], pairing); element_random(h[j]);
}
element_init_G1(u, pairing); element_random(u);
element_init_G1(w, pairing); element_random(w);
element_init_GT(gT, pairing); element_random(gT);
element_init_GT(hT, pairing); element_random(hT);
//generate private key skI
element_init_Zr(xl, pairing); element_random(xl);
element_pow_zn(yl, g1, xl); //compute yl
pkI[ ] = (gl,h[ ],u,w,gT,hT,yl); // Issuer's Public key
skI = xl; // Issuer's Secret key
```

To be able to make database queries, a user needs to obtain a credential for the categories she is allowed to access. To this end, the user runs the Issue protocol with the issuer as depicted in FIG. 5. The issuer determines which user has access to which categories. Apart from the issuer's public key, the user's input also includes the category vector $\vec{d}$ describing her access rights. The input of the issuer is his secret and public key and $\vec{d}$. As a result of the issuing protocol, the user will obtain an access credential for the vector $\vec{d}$. This credential is a triple (A,r,s) which is a signature on the messages $(d_1, \ldots, d_l) = \vec{d}$ using the signature scheme described in above.

Figure 6:
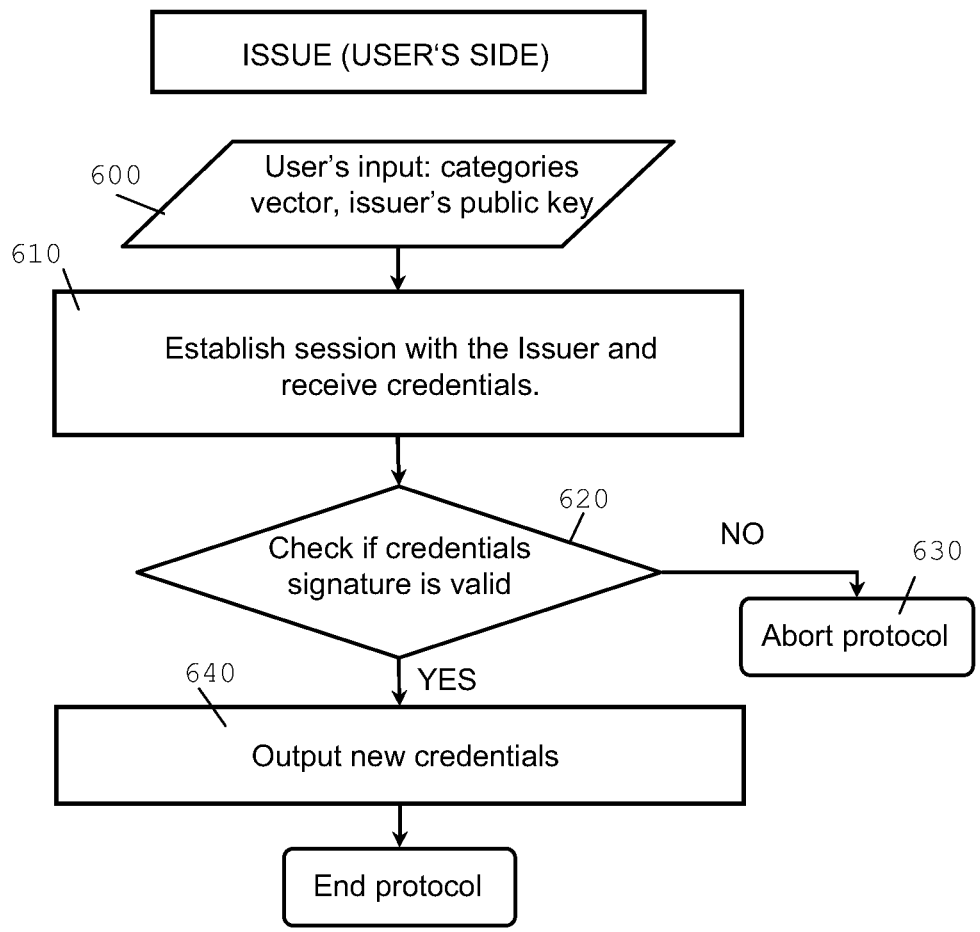
FIG. 6: Is a flow diagram of an implementation of the user's side of the issue protocol of FIG. 5.
Figure 7:
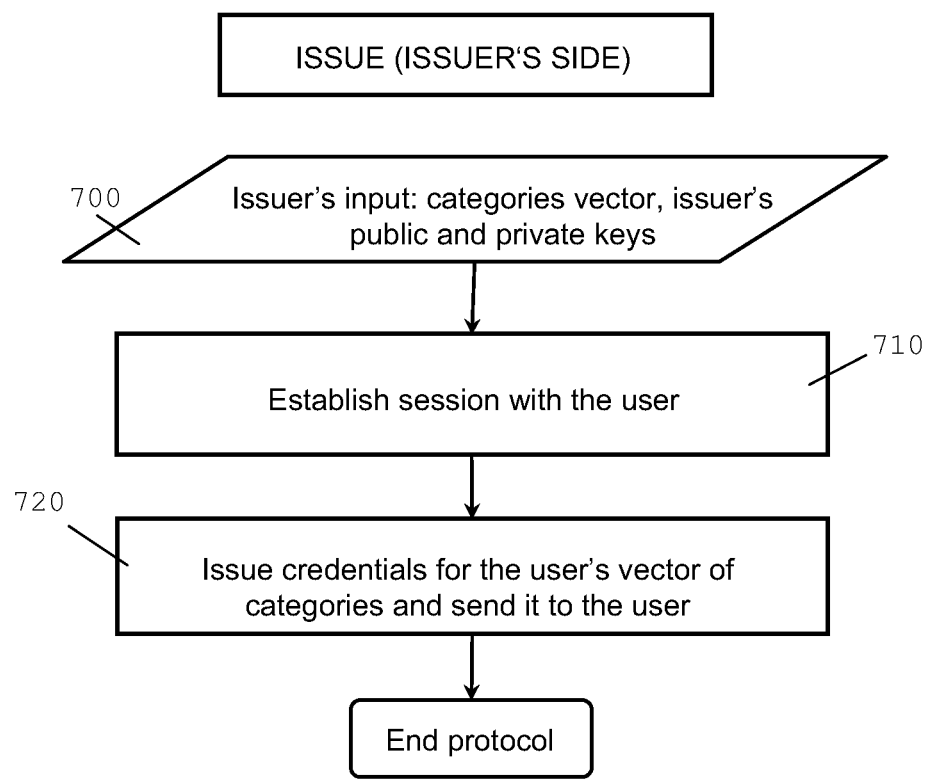
FIG. 7: Is a flow diagram of an implementation of the issuer's side of the issue protocol of FIG. 6.

FIG. 6 illustrates the user's side of the Issue protocol. In step 600, the user's input is provided: a categories vector and the public key of the issuer. In step 610, the user establishes a session with the issuer and receives the credential from the issuer. Then, in step 620, the user checks if the credential is valid. If not, then the protocol aborts in step 630. Otherwise the new credentials will be used in step 640. The issuer's side of the Issue protocol is shown in FIG. 7. The input of the issuer is provided in step 700: a categories vector and the issuer's public and private keys. In step 710, the issuer established the session with the user and subsequently issues the credentials for the user's vector of categories and sends it to the user in step 720.

To set up the database, the database server runs the algorithm shown in FIG. 8. That is, it uses the issuer's public key and a pairing group generator to create groups of the same order p and generate keys for encrypting records. First, the database provider generates its public and private keys to encrypt records. Also, it creates a GS-proof of knowledge $\pi_{setup}$ of its secret keys $x_e$ and $h_{DB}$, using the functions GS Prove and GS ProvePPE, as described above. This proof will enable the simulator to decrypt the contents of the database in the security proof. Then the database creates a signature $\sigma_i$ to bind the ACL and index to the encrypted record and "randomizes" it with value $V_i$. It also computes a commitment $V_i$ to the index.

ACL and $V_i \cdot V_i$ is used for signature verification. Next, it encrypts each record $R_i$ as $(\sigma_i, F_i)$, each with its own key. These keys not only depend on the database provider's secret key $(x_{DB})$, but also on the index of the record (i) and the categories defined in the access control list for the record ($\vec{c}_i$). The pairs $(\sigma_i, F_i)$ can be seen as an ElGamal encryption in $\Gamma_T$ of $R_i$ under the public key H.

Instead of using random elements from $\Gamma_T$ as the first component, the inventive protocol uses verifiably random values, the signatures $\sigma_i$. During the transfer phase, this verifiability allows the database to check that the user is requesting the decryption key for a record with an access control policy satisfied by the user's credential. To hide the record ACL the database provider generates ElGamal encryptions of each bit $c_{ij}$, for i=1, ..., N and j=1, ..., 1 (i.e., for each ACL $\vec{c}_i$) and provides a second NIZK GS-proof to prove knowledge of the plaintexts. The statement for this proof is $$stmt_i = (v_i, c_{ij}, r_{ij}); V_i = g^i y_1^{c_{i1}} \ldots y_l^{c_{il}} y_{l+1}^{v_i} \bigwedge_{j=1}^{l} \left( E_{ij}^{(1)} = g^{c_{ij}} y_e^{r_{ij}} \wedge E_{ij}^{(2)} = g_e^{r_{ij}} \right).$$

Finally, the encrypted record consists of the ciphertext and encrypted ACL along with a non-interactive zero-knowledge proof that everything was generated correctly:

$(\sigma_i, V_i, F_i, (E_{i1}, \ldots, E_{il}), \pi_i).$

Figure 9:
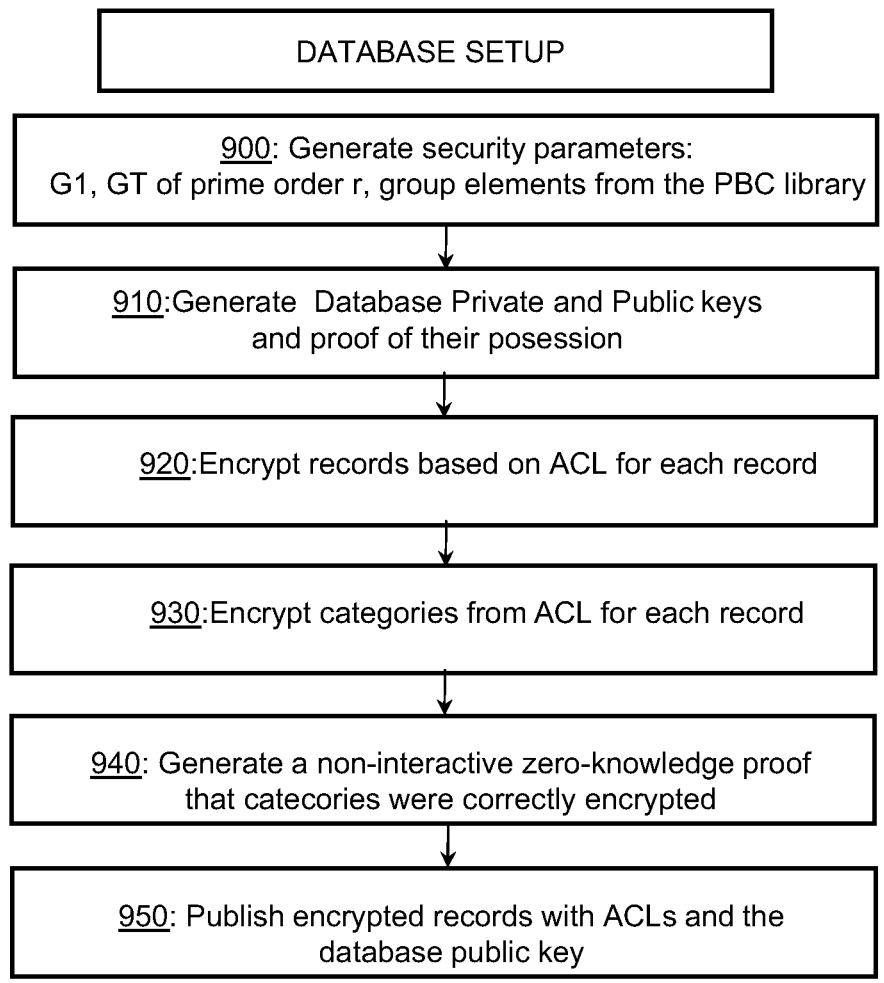
FIG. 9: Is a flow diagram of an implementation of the database setup protocol pf FIG. 8.

FIG. 9 illustrates the implementation of the database setup algorithm. In step 900, the security parameter are generated using the PBC library. Then, in step 910, the public and private keys are generated for the database and in step 920 the records of the database records are encrypted based on the access control lists. In step 930, the categories from the access control lists are encrypted for each record. Then, in step 940, a non-interactive zero-knowledge proof is performed, that the categories were correctly encrypted. Finally, the encrypted records and the public key of the database are published in step 950.

The following code fragment shows an example implementation for Step 900:

```
//generate system parameters
element_init_G1(h, pairing); element_random(h);
pairing_pp_t ppg; pairing_pp_init(ppg, g, pairing);
pairing_pp_t pph; pairing_pp_init(pph, h, pairing);
pairing_pp_apply(H, h, ppg);
```

An example implementation for step 910 is given by the following code fragment:

```
//generate private and public keys:
element_init_Zr(xDB, pairing); element_random(xDB);
element_pow_zn(yDB, g, xDB);
element_init_Zr(xE, pairing); element_random(xE);
element_pow_zn(yE, g, xE);
piSet[ ][ ] = piSetup(CRS, yE, g, XE);
for i = 1 to l+1 {
  element_init_Zr(x[i], pairing); element_random(x[i]);
  element_pow_zn(y[i], g, x[i]);
}
//Database's Public key
pkDB = (g,H,yDB, y[ ]);
```

```
//Database's Secret key
skDB = (h, xDB, x[ ]);
```

Step 920 can be implemented using the following code fragment:

```
//encrypt records (R[ ], ACL=c[ ][ ])
for i=1 to N
{
  element_init_Zr(v[i], pairing); element_random(v[i]);
  element_pow_zn(gl[i], g, i);
  element_pow_zn(yV[i], y[l+1], v[i]);
  int y = 1;
  for j = 1 to l {
    xC[i]=x[j]*c[i][j];
    element_pow_zn(yC[j], g, c[i][j]);
    y = y*yC[j];
  }
  V[i] = gl[i]*y*y[l+1];
  element_pow_zn(E[i], g, 1/(xDB+i+xC[i]+x[l+1]v[i]));
  pairing_pp_apply(T[i], E[i], pph);
  F[i] = T[i]*R[i]
}
```

Step 930 can be implemented using the following code fragment:

```
//encrypt categories from ACL (ACL=c[ ][ ])
for i = 1 to N
{
  for j = 1 to l
  {
    element_init_Zr(r[i][j], pairing); element_random(r[i][j]);
    element_pow_zn(yR[j], yE, r[i][j]);
    element_pow_zn(gC[j], g, c[i][j]);
    E_1[i][j] = gC[j]*yR[j];
    element_pow_zn(E_2[i][j], g, r[i][j]);
  }
}
```

After obtaining the encrypted database, the user must first verify it for correctness by checking (for each record i) the GS proof $\pi_i$ and the signature $\sigma_i$. This step is denoted DBVerify ($ER_i$) and is defined as:

$$\left( GSVerify(CRS, stmt_i, ((E_{ij}), V_i), (g, y_e, (y_j))) \wedge \left( e(g^i V_i, i) \stackrel{?}{=} e(g, h_{DB}) \right) \right).$$

Figure 10:
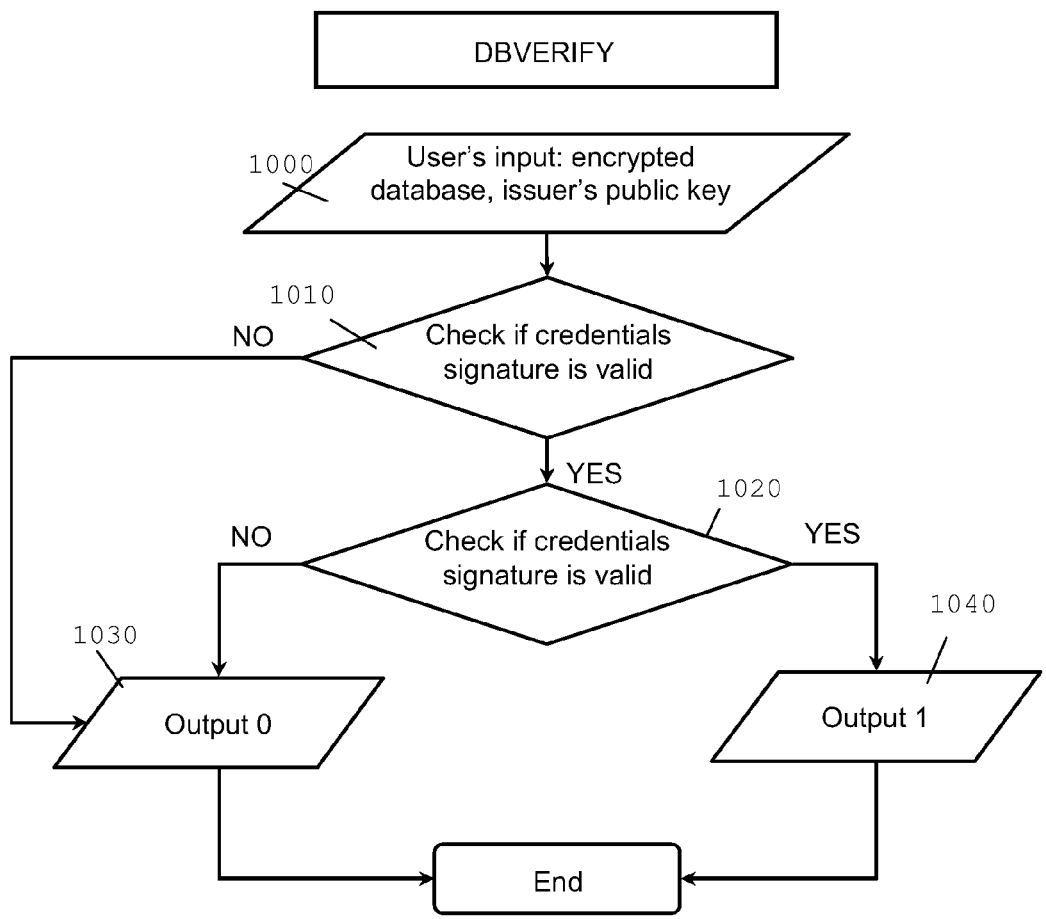
FIG. 10: Is a flow diagram of a verification step in accordance with the present invention.

An implementation is shown in FIG. 10. In step 1000, the user's input is provided: the encrypted database and the issuer's public key. In step 1010, the user checks if the signature of the credential is valid. If that is not the case, then this results in an output of 0 in step 1030. Otherwise an output of 1 is given in step 1040.

Figure 11:
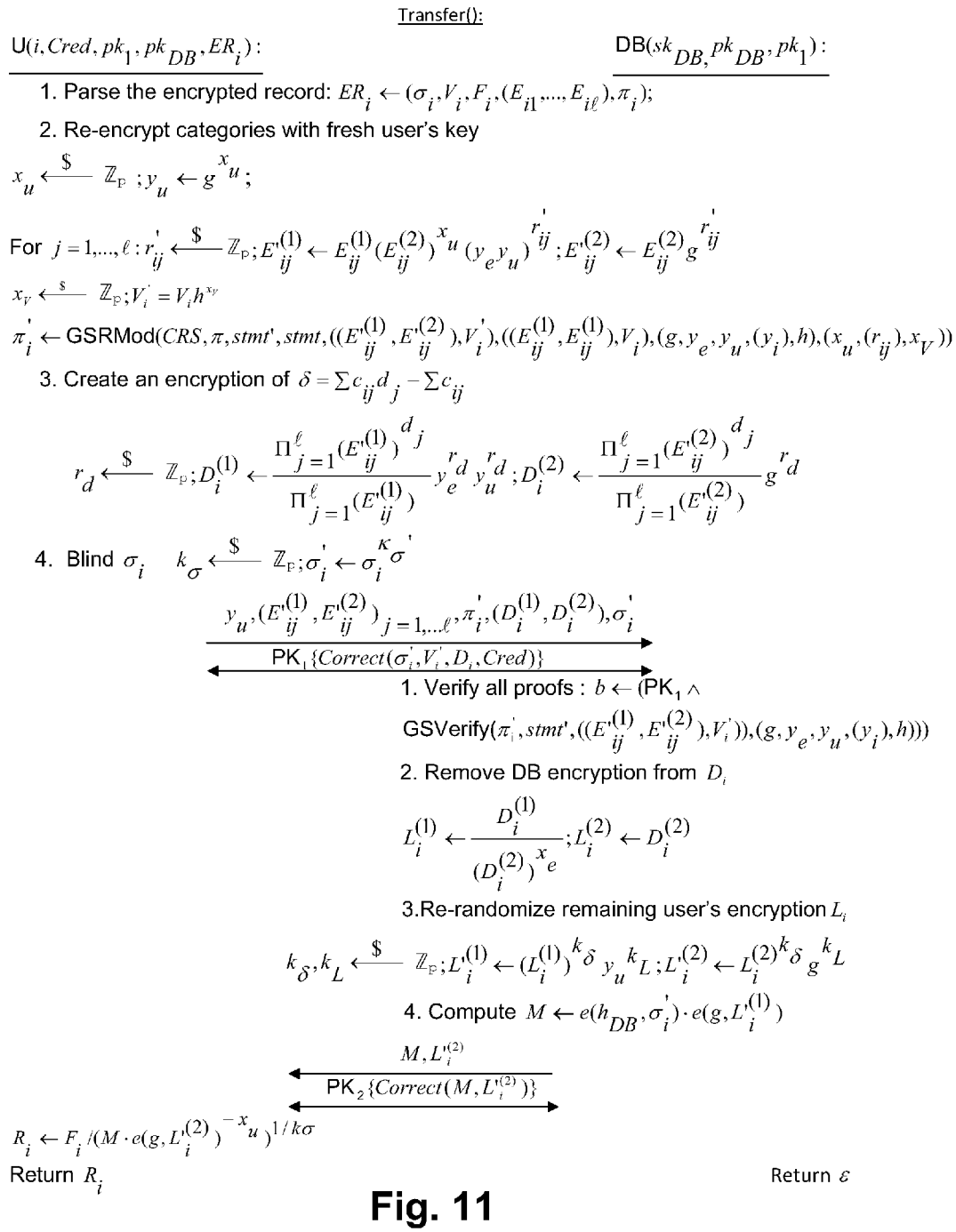
FIG. 11: Is a description of a transfer protocol between a user and a database server in accordance with the present invention.

Then the user verifies $\pi_{setup}$, the proof of the database secret keys. When the user wants to access a record in the database, she engages in a Transfer protocol as shown in FIG. 11 with the database provider. The input of the database server is its secret key and public key as well as the public key of the issuer. The input of the user are the public keys of the issuer and the database, the index i of the record she wants to access, her credential, and the encrypted record $ER_i=((\sigma_i, V_i, F_i, (E_{i1}, \ldots, E_{il}), \pi_i))$. At a high level, the protocol has three main steps. The user adds a second layer of encryption to the ACL, using a freshly generated keypair. Using the homomorphic properties of the encryption, the credential and ACL are compared, and the resulting ciphertext is sent to the database. If the ZK proof that the user performed the computation honestly is valid, the database removes the inner layer of encryption and returns the result to the user. Finally the user removes the other layer of encryption to recover the key for the record (or a random value if access is not granted).

Each step is now described in greater detail. The user takes ElGamal encryptions of each category bit for the record she wants to access, and re-encrypts them with her own key. Then using these values she calculates an ElGamal encryption of $$\delta = \left( \sum_{j=1}^{l} c_{ij} d_{ij} - \sum_{j=1}^{l} c_{ij} \right),$$

which will be 0 if $c_{ij}=d_j$. She then re-randomizes and modifies the GS proof $\pi$ in to the new one $\pi'$ for the statement $$\bigwedge_{j=1}^{l} \left( E_{ij}'^{(1)} = g^{c_{ij}} (y_e y_u)^{r_{ij}+r'_{ij}} \wedge E_{ij}'^{(2)} = g_e^{r_{ij}+r'_{ij}} \right)$$

$$stmt_i' = (v_i, c_{ij}, r_{ij}, x_V) : V_i' = g^i y_1^{c,1} \ldots y_l^{ci1} y_{l+1}^{v_i} h^{xV}$$

to prove that the new encryptions are consistent with the new commitment $V_i'$. Then the user randomizes $\sigma_i$ and sends this randomized version $\sigma_i'$ to the database provider. It should be noted that $\sigma_i$ is derived from the database provider's secret key, the index of the records, and, most importantly all the categories of the record.

Next the user proves that $\sigma_i'$ is correctly formed as a randomization of some $\sigma_i$ for which she possesses all necessary credentials, that $V_i'$ is consistent with $\sigma_i'$, and that $D_i$ is correctly formed from the re-encrypted ACL and her credentials. That is, she executes with the database provider the step that is referred to as $PK_1\{Correct(\sigma_i', C_i', D_i, Cred)\}$ in FIG. 11. At first the user blinds her credentials, as described above: and sends to the database provider and then executes the following proof of knowledge:

$$PK\Big\{ (i, k_\sigma, x_V, r_d, r, \alpha, \beta, s, t, t', d_1, \ldots, d_l) : e(\sigma_i', V_i') =$$

$$e(g, g)^{k_\sigma} e(\sigma_i', h)^{x_V} \wedge B =$$

$$w^t u^{t'} \wedge 1 = B^{-s} w^\alpha u^\beta \wedge \frac{\bar{e}(\tilde{A}, y_I)}{\bar{e}(g_I, g_I)} = \bar{e}(\tilde{A}, g_I)^{-s} \bar{e}(u, y_I^t g_I^\alpha)$$

$$\bar{e}(h_{l+1}, g_I)^r \prod_{j=1}^{l} \bar{e}(h_j, g_I)^{d_j} \wedge D_i^{(1)} \cdot \prod_{j=1}^{l} (E_{ij}'^{(1)}) =$$

$$\prod_{j=1}^{l} (E_{ij}'^{(1)})^{d_j} y_e^{r_d} y_u^{r_d} \wedge D_i^{(2)} \cdot \prod_{j=1}^{l} (E_{ij}'^{(2)}) =$$

$$\prod_{j=1}^{l} (E_{ij}'^{(2)})^{d_j} g^{r_d} \Big\}$$

If the proof is successful, then the database provider decrypts $D_i$, but adds randomization to the remaining encryption of $\delta$ (under the user's key). The database provider does this to prevent the user from cheating: if $\delta \neq 0$ then the database server sends an encryption of random value, which does not allow the user to decrypt the record. In other words, the database provider calculates the blinded decryption key for the record but multiplies it with the re-randomized decryption of 0 when access is allowed, or some random value when access is not allowed. The database then proves that is was computed correctly by executing with the user the protocol referred to $PK_2\{Correct(M, L_i'^{(2)})\}$ as in FIG. 11. It is a database zero-knowledge proof that the values M and $L_i'^{(2)}$ were computed correctly:

$$PK\{(h_{DB}, x_e, k_L, k_\sigma, \gamma): H = e(g, h_{DB}) \wedge y_e = g^{x_e} \wedge L_i'^{(2)} =$$
$$(D_i^{(2)})^{k_\sigma g k_L} \wedge 1 = y_e^{k_\sigma g \gamma} \wedge M = e(h_{DB}, \sigma_i') \cdot e(g,$$
$$(D_i^{(1)}))^{k_\sigma} e(g, (D_i^{(2)}))^\gamma e(g, g)^{k_L}\},$$

where $y = -x_e k_\delta$.

When the user gets L from the database, removes all randomness and decrypts, the decrypted value $R_i$ is correct if and only if $\delta=0$. The database provider has to calculate encryptions of all ACLs and encrypt all records $(1, \ldots, N)$ only once at the setup phase and the user has to download and verify the entire encrypted database only once as well. So the communication and computation complexity of the protocol depends on the number of the records in the database only in the setup and verify phases. The other parts of the protocol (issue and transfer) require only O(l) group elements to be sent and exponentiations and pairings to be computed, where l is the size of the ACL vector.

Figure 12:
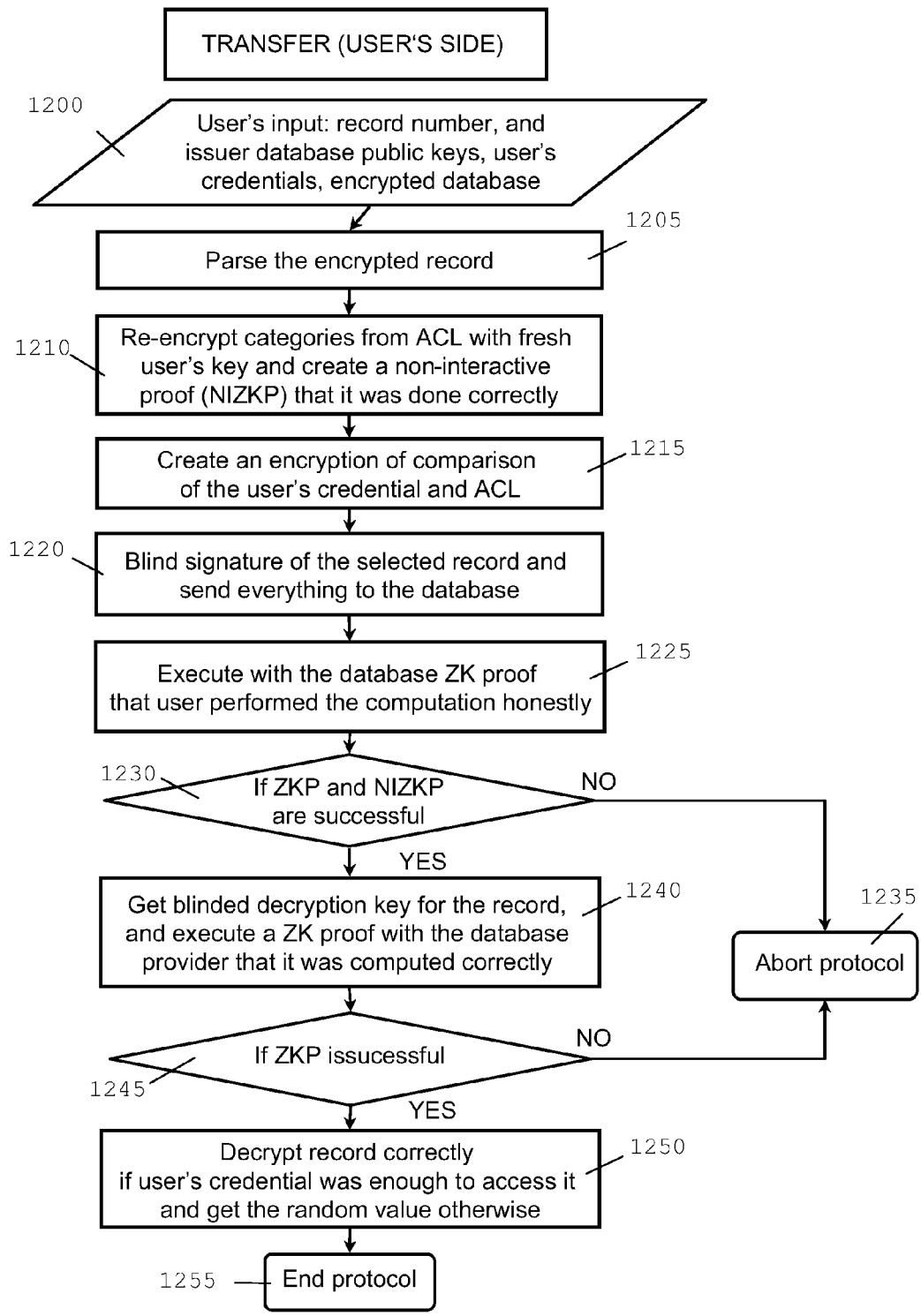
FIG. 12: Is a flow diagram of an implementation of the user's side of the transfer protocol of FIG. 11.

An implementation for the user's side of the Transfer protocol is shown in FIG. 12. In step 1200, the user's input is provided: the record number, the public keys of the issuer and the database, the user's credentials and the encrypted database. The encrypted record is then parsed in step 1205. The categories from the ACL are then re-encrypted in step 1210 with a fresh user key and a non-interactive proof that this was performed correctly is executed. For the comparison between the user's credential and the ACL, an encryption is created in step 1215. The signature of the selected record is then blinded in step 1220 and sends with the non-interactive proof, the encryption of the comparison and the re-encrypted ACL to the database provider. Then, in step 1225, a zero-knowledge proof is executed with the database provider that the user performed the computation honestly. It will be determined in step 1230 if the zero-knowledge proof and the non-interactive proof were successful. If not, then the protocol is aborted in step 1235. Otherwise, the blinded encryption key will be used in step 1240 to execute a zero-knowledge proof with the database provider that it was computed correctly. In step 1245, the user determines if the proof was successful. If not, then the protocol aborts in step 1235. Otherwise, if the user's credential was enough to access it, the record will be decrypted correctly in step 1250, otherwise the random value will be obtained. The protocol ends in step 1255 then.

Figure 13:
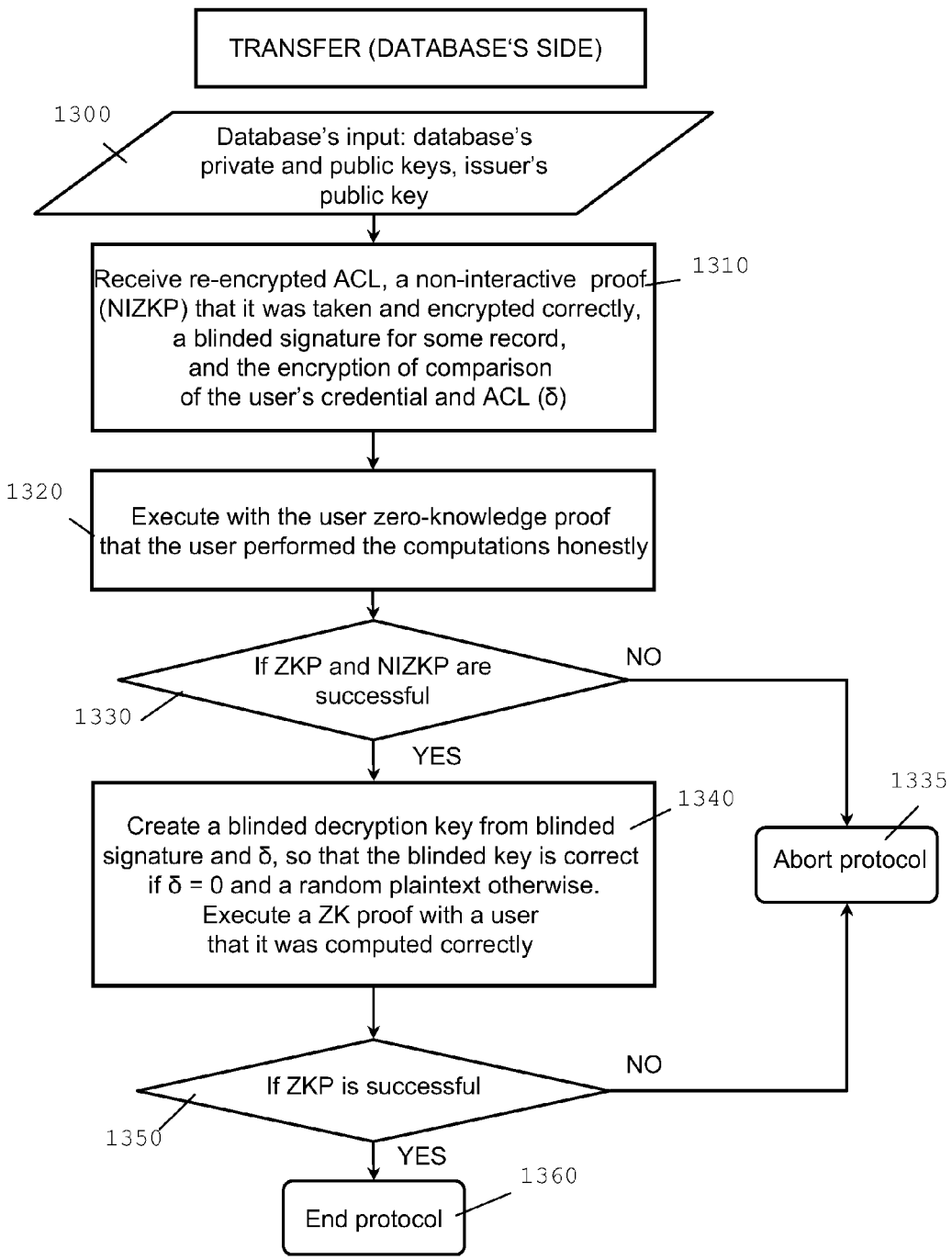
FIG. 13: Is a flow diagram of an implementation of the database's side of the transfer protocol of FIG. 11.

An implementation for the database's side of the Transfer protocol is shown in FIG. 13. The input of the database provider is provided in step 1300: the private and public keys of the database provider and the issuer's public key. The re-encrypted ACL, a blinded signature for some record and the encryption of the comparison of the user's credential and a non-interactive proof that the ACL was taken and encrypted correctly ACL are received in step 1310. Then the database provider executes a zero-knowledge proof with the user that the user performed the computations honestly in step 1320. In step 1330, it will be determined then if the zero-knowledge proof and the non-interactive proof were successful. If not, then the protocol aborts in step 1335. Otherwise, a blinded decryption key is created from the blinded signature and a in step 1340, so that the blinded key is correct if $\sigma=0$ and a random plaintext otherwise, and a zero-knowledge proof with a user that it was computed correctly. The database provider will then determine in step 1350 if the zero-knowledge proof was successful. If not, then the protocol aborts in step 1335. Otherwise, the protocol ends in step 1360.

The inventive protocol has the following properties. The database provider cannot tell which user makes a query, nor can it tell which record is being accessed. The database provider only learns that some user is trying to access some record but does not learn whether the attempt was successful. If the database provider and the issuer collude, then they know which user possibly has access to which records, but they still do not know which record is actually being accessed. The inventive protocol protects both the records and the access control lists in the database. Users cannot access records for which they do not have the necessary credentials, and in each transfer can only obtain a single record for which they do have access. The only information about the ACL that a user can derive from a successful or failed transfer is that her credentials do or do not cover the access control list, respectively. Colluding users cannot pool their credentials, meaning that they cannot access any records that none of them can have been able to obtain individually. If the issuer colludes with one or more users, they can only obtain as many records from the database as the number of transfer queries that were performed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention can be embodied as a system, method or computer program product. Accordingly, the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, the present invention can take the form of a computer program product embodied in any tangible medium of expression having computer usable program code embodied in the medium.

Any combination of one or more computer usable or computer readable medium(s) can be utilized. The computer-usable or computer-readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium can even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium can be any medium that can contain, store, communicate, propagate, or transport the program for use by or in connection with the instruction execution system, apparatus, or device. The computer-usable medium can include a propagated data signal with the computer-usable program code embodied therewith, either in baseband or as part of a carrier wave. The computer usable program code can be transmitted using any appropriate medium, including but not limited to wireless, wireline, optical fiber cable, RF, etc.

Computer program code for carrying out operations of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 14:
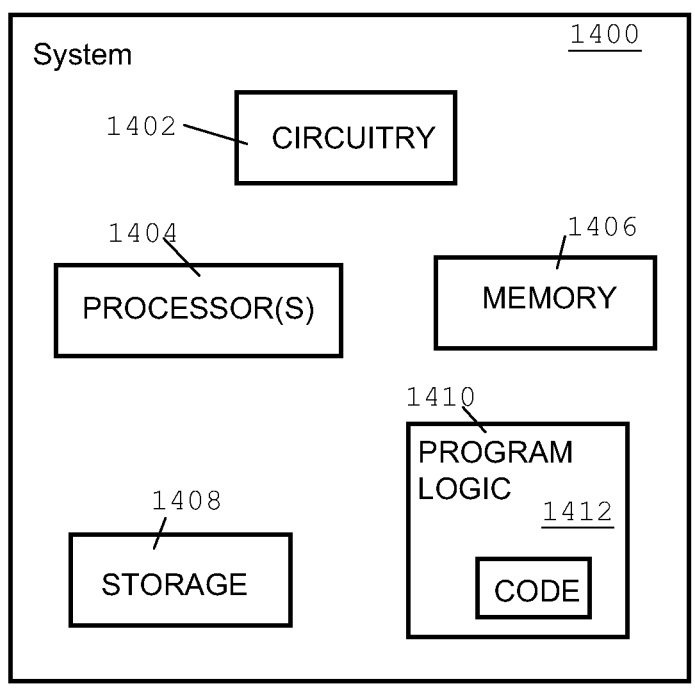
FIG. 14: Is a block diagram of a system in which certain embodiments can be implemented.

FIG. 14 illustrates a block diagram of a computer system 1400 in which certain embodiments can be implemented. The system 1400 can include a circuitry 1402 that can in certain embodiments include a microprocessor 1404. The computer system 1400 can also include a memory 1406 (e.g., a volatile memory device), and storage 1408. The storage 1408 can include a non-volatile memory device (e.g., EEPROM, ROM, PROM, RAM, DRAM, SRAM, flash, firmware, programmable logic, etc.), magnetic disk drive, optical disk drive, tape drive, etc. The storage 1408 can include an internal storage device, an attached storage device and/or a network accessible storage device. The system 1400 can include a program logic 1410 including code 1412 that can be loaded into the memory 1406 and executed by the microprocessor 1404 or circuitry 1402. In certain embodiments, the program logic 1410 including code 1412 can be stored in the storage 1408. In certain other embodiments, the program logic 1410 can be implemented in the circuitry 1402. Therefore, while FIG. 13 shows the program logic 1410 separately from the other elements, the program logic 1410 can be implemented in the memory 1406 and/or the circuitry 1402.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer system comprising:
a first processor device of a database server configured to publish an encrypted form of a database, the database comprising at least one record with an associated index and a list of access-control attributes for each record;
at least one user of the database;
an Issuer configured to provide a credential for each access-control attribute of the database, which is assigned to the at least one user;
wherein said computer system comprises:
a memory storage device,
a processor device; said processor device associated with said memory storage device and configured to perform a method to encrypt a database, said method comprising:
generating an encryption key for a record such that the encryption key is derived from at least the index of the record and the access-control attributes and a secret key of the database server;
encrypting using the generated encryption key a database record; and
encrypting the access-control attributes, said access-control encrypting including configuring a generator to generate a non-interactive zero-knowledge proof that the access-control attributes were correctly encrypted;
and the first processor of the database server being responsive to the database encryptor, wherein users are enabled to access the database record while the database does not learn who queries the record, nor which record was being queried, wherein to access the database record, said first processor device is further configured to:
receive, at the database server, an input comprising a selected record, an issuer's public key, and database private and public keys, a user's credential, a re-encryption of the encrypted access-control attributes with a fresh user key, a non-interactive proof that the re-encryption was taken and encrypted correctly, a blinded signature for the selected record, and an encryption of a comparison between the user's credential and ACL attributes;
execute with the user zero-knowledge proof that the user performed the computations honestly;
create a blinded decryption key from blinded signature and ACL attribute for the selected record to execute the zero-knowledge proof with the database provider, if the database provider verifies the zero-knowledge proof and the non-interactive proof were successful; and
decrypt the selected record if user's credential was enough to access the record.

2. The computer system of claim 1, where the Issuer is configured using the ISetup(C) algorithm which comprises:

$$(\overline{G}, \overline{G}_T, p) \xleftarrow{\$} Pg(1^\kappa); g_1, h_0, \ldots, h_{l+1}, u,$$
$$w \xleftarrow{\$} \overline{G}^{l+5} g_t, h_t \xleftarrow{\$} \overline{G}_T^2; x_I \xleftarrow{\$} \mathbb{Z}_p; y_I \leftarrow g_1^{x_I}$$

Return $$(sk_I \leftarrow x_I, pk_I \leftarrow (g_1, h_0, \ldots, h_{l+1}, u, w, g_t, h_t, y_I)).$$

3. The computer system of claim 1, wherein the key generator is configured to generate an encryption key using an algorithm comprising:

$$g, h \xleftarrow{\$} G_1^*; h_{DB} \xleftarrow{\$} G_2^*; H \leftarrow e(g, h_{DB})x_e, x_{DB} \xleftarrow{\$}; y_e \leftarrow g^{x_e}; y_{DB} \leftarrow g^{x_{DB}}$$
$$\pi_{setup} =$$
$$(GSProve(CRS, y_e = g^{x_e}, y_e, g, x_e), GSProvePPE(CRS, H, g, h_{DB}))$$

For $$i = 1, \ldots, \ell + 1 \text{ do}$$
$$x_i \xleftarrow{\$}; y_i \leftarrow g^{x_i} sk_{DB} \leftarrow (h_{DB}, x_e, x_{DB}, x_1, \ldots, x_{\ell+1});$$
$$pk_{DB} \leftarrow (g, H, h, y_e, y_{DB}, y_1, \ldots, y_{\ell+1}, \pi_k).$$

4. The computer system of claim 1, wherein the record encryptor is configured to encrypt a record using an algorithm comprising:

$$v_i \xleftarrow{\$} \mathbb{Z}_p; V_i \leftarrow g^i y_1^{c_{i\ell}} \ldots y_\ell^{c_{i\ell}} y_{\ell+1}^{v_i}$$
$$\overline{x_{DB} + i + \sum_{j=1}^{\ell} x_j \cdot c_{ij} + x_\ell + 1^{v_i}}$$
$$\sigma_i \leftarrow g$$
$$F_i \leftarrow e(h_{DB}, \sigma_i) \cdot R_i.$$

5. The computer system of claim 1, wherein the access-control encryptor is configured to encrypt the access-control attributes using an algorithm comprising:

$$\text{For each bit } c_{ij} \text{ generate } r_{ij} \xleftarrow{\$} \mathbb{Z}_p, j = 1 \ldots \ell$$
$$E_{ij}^{(1)} = g^{c_{ij}} y_e^{r_{ij}};$$
$$E_{ij}^{(2)} = g^{r_{ij}};$$
$$E_{ij} = (E_{ij}^{(1)}, E_{ij}^{(2)}).$$

6. The computer system of claim 1, wherein the generator of the access-control encryptor is configured to generate a non-interactive zero-knowledge proof using an algorithm comprising:

$$\pi_i = \text{GSProve}(CRS, stmt_i, ((E_{ij}), V_i), (g, y_e, (y_j)), (v_i, (c_{ij}), (r_{ij}))).$$

7. The computer system of claim 1, where a user further comprises:
a re-encryptor configured to encrypt the encrypted access-control attributes and to transform the non-interactive zero-knowledge proof to let it show that the re-encryption was done correctly.

8. The computer system of claim 7, wherein the re-encryptor is configured using an algorithm comprising:

$$x_u \xleftarrow{\$} \mathbb{Z}_p; y_u \leftarrow g^{x_u};$$

For $$j = 1, \ldots, \ell : r'_{ij} \xleftarrow{\$} \mathbb{Z}_p; E_{ij}^{'(1)} \leftarrow E_{ij}^{(1)} (E_{ij}^{(2)})^{x_u} (y_e y_u)^{r'_{ij}};$$
$$E_{ij}^{'(2)} \leftarrow E_{ij}^{(2)} g^{r'_{ij}} x_V \xleftarrow{\$} \mathbb{Z}_p; V'_i = V_i h^{x_V}$$
$$\pi'_i \leftarrow \text{GSRMod}\big(CRS, \pi, stmt', stmt, \big((E_{ij}^{'(1)}, E_{ij}^{'(2)})\big), V'_i\big),$$
$$((E_{ij}^{(1)}, E_{ij}^{(1)}), V_i), (g, y_e, y_u, (y_i), h), (x_u, (r_{ij}), x_V)\big).$$

9. A method for anonymously reading records from a database provided by a database server, wherein the database comprises at least one record with an associated index and a list of access-control attributes for each record, and wherein the database server publishes an encrypted form of the database, and wherein at least one user of the database obtains credentials from an Issuer for each access-control attribute which is assigned to the at least one user, and wherein for each record in the encrypted form of the database the following steps are performed:
generating a key that is derived from at least the index of the record and the access-control attributes and a secret key of the database server;
encrypting the record with the key;
encrypting the associated lists of access-control attributes for each record in the encrypted form of the database; and
generating a non-interactive zero-knowledge proof that the access-control attributes were correctly encrypted,
wherein users are enabled to access the database record while the database does not learn who queries the record, nor which record was being queried, wherein to access the database record, the method further comprises:
receiving, at the database server, an input comprising a selected record, an issuer's public key, and database private and public keys, a user's credential, a re-encryption of the encrypted access-control attributes with a fresh user key, and a non-interactive proof that the re-encryption was taken and encrypted correctly, a blinded signature for the selected record, and an encryption of a comparison between the user's credential and ACL attributes;
executing with the user zero-knowledge proof that the user performed the computations honestly;
creating a blinded decryption key from blinded signature and ACL attribute for the selected record to execute a zero-knowledge proof with the database provider, if the database provider verifies the zero-knowledge proof and the non-interactive proof were successful; and
decrypting the selected record if user's credential was enough to access the record.

10. The method of claim 9, wherein the step of generating a key further comprises executing the algorithm:

$$g, h \xleftarrow{\$} G_1^*; h_{DB} \xleftarrow{\$} G_2^*; H \leftarrow e(g, h_{DB}) x_e, x_{DB} \leftarrow; y_e \leftarrow g^{x_e}; y_{DB} \leftarrow g^{x_{DB}}$$
$$\pi_{setup} =$$
$$(\text{GSProve}(CRS, y_e = g^{x_e}, y_e, g, x_e), \text{GSProvePPE}(CRS, H, g, h_{DB}))$$

For $$i = 1, \ldots, \ell + 1 \text{ do}$$
$$x_i \xleftarrow{\$} ; y_i \leftarrow g^{x_i} sk_{DB} \leftarrow (h_{DB}, x_e, x_{DB}, x_1, \ldots, x_{\ell+1});$$
$$pk_{DB} \leftarrow (g, H, h, y_e, y_{DB}, y_1, \ldots, y_{\ell+1}, \pi_k).$$

11. The method of claim 9, wherein the step of encrypting the record further comprises executing the algorithm:

$$\frac{v_i \xleftarrow{\$} ; V_i \leftarrow g^i y_1^{c_{i1}} \ldots y_{1\ell}^{c_{i\ell}} y_{\ell+1}^{v_i}}{x_{DB} + i + \sum_{j=1}^{\ell} x_j \cdot c_{ij} + x_\ell + 1^{v_i}}$$
$$\sigma_i \leftarrow g$$
$$F_i \leftarrow e(h_{DB}, \sigma_i) \cdot R_i.$$

12. The method of claim 9, wherein the step of encrypting the associated lists of access-control attributes further comprises executing the algorithm:

$$\text{For each bit } c_{ij} \text{ generate } r_{ij} \xleftarrow{\$} \mathbb{Z}_p, j = 1 \ldots \ell$$
$$E_{ij}^{(1)} = g^{c_{ij}} y_e^{r_{ij}};$$
$$E_{ij}^{(2)} = g^{r_{ij}};$$
$$E_{ij} = (E_{ij}^{(1)}, E_{ij}^{(2)}).$$

13. The method of claim 9, wherein the step of generating a non-interactive zero-knowledge proof further comprises executing the algorithm:

$$\pi_i = \text{GSProve}(CRS, stmt_i, ((E_{ij}), V_i), (g, y_e, (y_j)), (v_i, (c_{ij}), (r_{ij}))).$$

14. The method of claim 9, further comprising the step performed by a user:
re-encrypting the encrypted access-control attributes and transforming the non-interactive zero-knowledge proof to prove that the re-encryption was done correctly.

15. The method of claim 14, wherein the user re-encrypting the encrypted access-control attributes and transforming the non-interactive zero-knowledge proof step further comprises the steps of:
- providing a user input comprising of a record number, issuer and database public keys, user's credentials and encrypted database;
- parsing the encrypted record;
- re-encrypting the encrypted access-control attributes with the fresh user key and a non-interactive proof
- creating the encryption of comparison of the user's credential and access-control attributes;
- blinding the signature of the selected record and sending the non-interactive proof, the encryption of the comparison and the re-encrypted access-control attributes to the database provider;
- receiving a blinded decryption key for the record to execute a zero-knowledge proof with the database provider, if the database provider verifies the zero-knowledge proof and the non-interactive proof were successful;
- decrypting the record if user's credential was enough to access the record, otherwise, obtaining a random value if user's credential was not enough to access the record.

16. The method of claim 15, wherein the step of re-encrypting the encrypted attributes with a fresh user key comprises executing the algorithm:

$$x_u \xleftarrow{\$} \mathbb{Z}_p; y_u \leftarrow g^{x_u};$$

For $$j = 1, \ldots, \ell: r'_{ij} \xleftarrow{\$} \mathbb{Z}_p; E'^{(1)}_{ij} \leftarrow E^{(1)}_{ij} (E^{(2)}_{ij})^{x_u} (y_e y_u)^{r'_{ij}};$$

$$E'^{(2)}_{ij} \leftarrow E^{(2)}_{ij} g^{r'_{ij}} x_V \xleftarrow{\$} \mathbb{Z}_p; V'_i = V_i h^{x_V}$$

$$\pi'_i \leftarrow GSRMod(CRS, \pi, stmt', stmt, ((E'^{(1)}_{ij}, E'^{(2)}_{ij}), V'_i),$$

$$((E^{(1)}_{ij}, E^{(1)}_{ij}), V_i), (g, y_e, y_u, (y_i), h), (x_u, (r_{ij}), x_V)).$$

17. A computer readable storage medium tangibly embodying a computer readable program code having computer readable instructions which, when implemented, cause a computer to carry out the steps of a method for anonymously reading records from a database provided by a database server, said computer readable storage medium not a propagating signal, wherein the database comprises at least one record with an associated index and a list of access-control attributes for each record, and wherein the database server publishes an encrypted form of the database, and wherein at least one user of the database obtains credentials from an Issuer for each access-control attribute which is assigned to the at least one user, and wherein for each record in the encrypted form of the database the following steps are performed:
- generating a key that is derived from at least the index of the record and the access-control attributes and a secret key of the database server;
- encrypting the record with the key;
- encrypting the associated lists of access-control attributes for each record in the encrypted form of the database; and
- generating a non-interactive zero-knowledge proof that the access-control attributes were correctly encrypted, wherein users are enabled to access the database record while the database does not learn who queries the record, nor which record was being queried, wherein to access the database record, the method further comprises:
- receiving, at the database server, an input comprising a selected record, an issuer's public key, and database private and public keys, a user's credential, a re-encryption of the encrypted access-control attributes using a fresh user key, and a non-interactive proof that the re-encryption was taken and encrypted correctly, a blinded signature for the selected record, and an encryption of a comparison between the user's credential and ACL attributes;
- executing with the user zero-knowledge proof that the user performed the computations honestly;
- creating a blinded decryption key from blinded signature and ACL attribute for the selected record to execute the zero-knowledge proof with the database provider, if the database provider verifies the zero-knowledge proof and the non-interactive proof were successful; and
- decrypting the selected record if user's credential was enough to access the record.

18. The computer readable storage medium of claim 17, further comprising the step performed by a user:
- re-encrypting the encrypted access-control attributes and transforming the non-interactive zero-knowledge proof to prove that the re-encryption was done correctly.

19. The computer readable storage medium of claim 17, wherein the user re-encrypting the encrypted access-control attributes and transforming the non-interactive zero-knowledge proof step further comprises the steps of:
- providing a user input comprising of a record number, issuer and database public keys, user's credentials and encrypted database;
- parsing the encrypted record;
- re-encrypting the encrypted access-control attributes with the fresh user key and a non-interactive proof
- creating the encryption of comparison of the user's credential and access-control attributes;
- blinding the signature of the selected record and sending the non-interactive proof, the encryption of the comparison and the re-encrypted access-control attributes to the database provider;
- receiving a blinded decryption key for the record to execute a zero-knowledge proof with the database provider, if the database provider verifies the zero-knowledge proof and the non-interactive proof were successful;
- decrypting the record if user's credential was enough to access the record, otherwise, obtaining a random value if user's credential was not enough to access the record.

20. The computer readable storage medium of claim 19, wherein the step of re-encrypting the encrypted attributes with a fresh user key comprises executing the algorithm:

$$x_u \xleftarrow{\$} \mathbb{Z}_p; y_u \leftarrow g^{x_u};$$

For $$j = 1, \ldots, \ell: r'_{ij} \xleftarrow{\$} \mathbb{Z}_p; E'^{(1)}_{ij} \leftarrow E^{(1)}_{ij} (E^{(2)}_{ij})^{x_u} (y_e y_u)^{r'_{ij}};$$

$$E'^{(2)}_{ij} \leftarrow E^{(2)}_{ij} g^{r'_{ij}} x_V \xleftarrow{\$} \mathbb{Z}_p; V'_i = V_i h^{x_V}.$$

* * * * *